US012579131B2

(12) United States Patent
Mishra et al.

(10) Patent No.: US 12,579,131 B2
(45) Date of Patent: Mar. 17, 2026

(54) TRANSACTIONALLY CONSISTENT HNSW INDEX

(71) Applicant: Oracle International Corporation, Redwood Shores, CA (US)

(72) Inventors: Aurosish Mishra, Foster City, CA (US); Sukhada Shashank Pendse, Foster City, CA (US); Agnivo Saha, Belmont, CA (US); Rohan Aggarwal, Menlo Park, CA (US); Xianqi Wang, Foster City, CA (US); Shasank Kisan Chavan, Menlo Park, CA (US); Tirthankar Lahiri, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/885,635

(22) Filed: Sep. 14, 2024

(65) Prior Publication Data

US 2025/0094412 A1 Mar. 20, 2025

Related U.S. Application Data

(60) Provisional application No. 63/563,926, filed on Mar. 11, 2024, provisional application No. 63/583,298, filed on Sep. 17, 2023, provisional application No. 63/583,259, filed on Sep. 16, 2023.

(51) Int. Cl.
G06F 16/22 (2019.01)
G06F 16/23 (2019.01)
(52) U.S. Cl.
CPC ...... G06F 16/2379 (2019.01); G06F 16/2237 (2019.01); G06F 16/2246 (2019.01); G06F 16/2358 (2019.01)

(58) Field of Classification Search
None
See application file for complete search history.

(56) References Cited

U.S. PATENT DOCUMENTS

| | | | | |
|---|---|---|---|---|
| 11,055,286 B2 * | 7/2021 | Perumalla | ........... | G06F 16/2237 |
| 11,093,497 B1 * | 8/2021 | Gupta | ................. | G06F 16/2343 |

(Continued)

OTHER PUBLICATIONS

Zhang et al., "Loop Closure Detection with Incremental Proximity Graph and Multi-words Quantization", 2022 The 13th Asian Control Conference (ASCC 2022), Jeju Island, Korea, May 4-7, 2022, 6 pages.

(Continued)

*Primary Examiner* — Eliyah S. Harper
(74) *Attorney, Agent, or Firm* — Hickman Becker Bingham Ledesma LLP

(57) ABSTRACT

Techniques for providing a transactionally-consistent Hierarchical Navigable Small Worlds (HNSW) index are described. In one technique, a HNSW index for a plurality of vectors is stored. In response to receiving a set of changes to the plurality of vectors, storing the set of changes in a shared journal table instead of applying the set of changes to the HNSW index. in response to receiving a vector query that includes a query vector, a subset of the set of changes in the shared journal table is identified based on the query vector. Also, based on the query vector and the HNSW index, a subset of the plurality of vectors is identified. A result of the vector query is generated based on the subset of the set of changes and the subset of the plurality of vectors.

20 Claims, 15 Drawing Sheets

(56) References Cited

U.S. PATENT DOCUMENTS

| | | | |
|---|---|---|---|
| 11,436,270 | B2 | 9/2022 | Skupin |
| 2010/0217778 | A1 | 8/2010 | Bernard |
| 2013/0332484 | A1* | 12/2013 | Gajic ................... G06F 16/285 |
| | | | 707/E17.014 |
| 2017/0223036 | A1 | 8/2017 | Muddu |
| 2018/0189369 | A1 | 7/2018 | Baek |
| 2019/0251069 | A1 | 8/2019 | Walker |
| 2021/0173896 | A1* | 6/2021 | Perumalla .......... G06F 16/2343 |
| 2023/0140125 | A1* | 5/2023 | Glesinger ................ G06N 3/08 |
| | | | 704/9 |
| 2023/0153338 | A1* | 5/2023 | Mai ...................... G06F 16/325 |
| | | | 707/706 |
| 2023/0222393 | A1* | 7/2023 | Zahm ..................... G06F 40/35 |
| | | | 706/12 |
| 2023/0332923 | A1 | 10/2023 | Collins |
| 2025/0068605 | A1 | 2/2025 | Diaconu |
| 2025/0156483 | A1* | 5/2025 | Lecroart ............. G06F 16/2379 |

OTHER PUBLICATIONS

Wei et al. "AnalyticDB-V : a hybrid analytical engine towards query fusion for structured and unstructured data", Proceedings of the VLDB Endowment, Aug. 1, 2020, 14 pages.

Wang et al., "Milvus: A Purpose-Built Vector Data Management System", Proceedings of the 2021 International Conference on Management of Data, Jun. 9, 2021, 14 pages.

Singh et al., "FreshDiskANN: A Fast and Accurate Graph-Based ANN Index for Streaming Similarity Search", arxiv.org, Cornell University Library, May 20, 2021, 19 pages.

Neganov, "Multi-versioned log-structured index", 2022 Ivannikov Memorial Workshop, IEEE, Sep. 23, 2022, 8 pages.

Korobko, "Multi-Versioning in Oracle explained recursive INSERT", Medium, Jul. 12, 2020, Available: URL:https://medium.com/ @vladimir.korobko/multi-versioning-inoracle-explained-using-recursive-insert-585a08b74ac7, 6 pages.

Guiterrrez et al., "A spatio-temporal access method based on snapshots and events", GIS'05. Proceedings of the 13th. ACM International Workshop on Geographic Information Systems, Nov. 4-5, 2005, 10 pages.

Anonymous, "Hierarchical Navigable Small Worlds (HNSW)", Aug. 29, 2023, Available: URL:https://web.archive.org/web/ 20230829030406/https://www.pinecone.io/learn/s eries/faiss/ hnsw/, 21 pages.

Anonymous, "GitHub—pgvector/pgvector: Open-source vector similarity search for Postgres", Sep. 14, 2023, Available: : https://web. archive.org/we, 16 pages.

He et al., "Neural Collaborative Filtering", https://dl.acm.org/doi/ pdf/10.1145/3038912.3052569, pp. 173-181 (Year: 2017).

* cited by examiner

300

310
IDENTIFY A PARTICULAR VERSION OF A VECTOR

320
SELECT A VECTOR OBJECT

330
IDENTIFY A VERSION OF THE VECTOR IN THE VECTOR OBJECT

340
DOES THE IDENTIFIED VERSION IN THE VECTOR OBJECT CORRESPOND TO THE PARTICULAR VERSION?

NO

YES

350
RETRIEVE, FROM THE VERSION OBJECT, THE VERSION DATA OF THE IDENTIFIED VERSION

360
IDENTIFY A LOCATION OF THE NEXT VECTOR DATA WITHIN THE VECTOR OBJECT

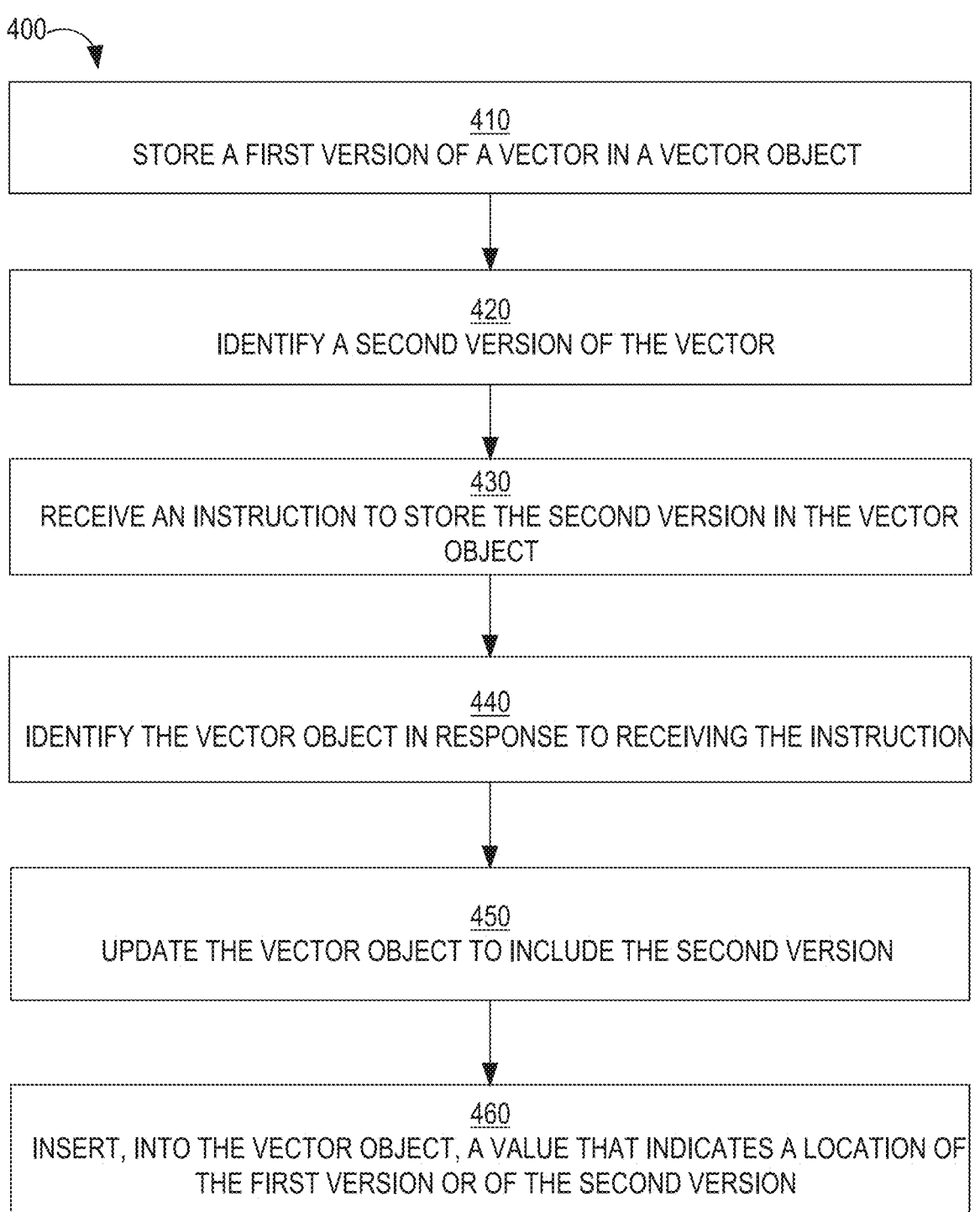

400

410
STORE A FIRST VERSION OF A VECTOR IN A VECTOR OBJECT

420
IDENTIFY A SECOND VERSION OF THE VECTOR

430
RECEIVE AN INSTRUCTION TO STORE THE SECOND VERSION IN THE VECTOR OBJECT

440
IDENTIFY THE VECTOR OBJECT IN RESPONSE TO RECEIVING THE INSTRUCTION

450
UPDATE THE VECTOR OBJECT TO INCLUDE THE SECOND VERSION

460
INSERT, INTO THE VECTOR OBJECT, A VALUE THAT INDICATES A LOCATION OF THE FIRST VERSION OR OF THE SECOND VERSION

*FIG. 4*

Entry Point

Layer 3 — Find nearest neighbor then go down a layer

812

Query Vector 802

822

Layer 2 — Find nearest neighbor then go down a layer

832

Layer 1 — Find nearest neighbor then go down a layer

Layer 0 — Find nearest K neighbors

900

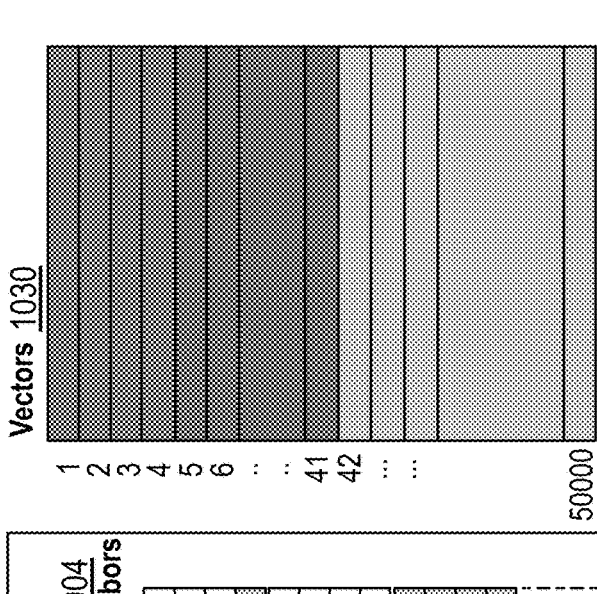
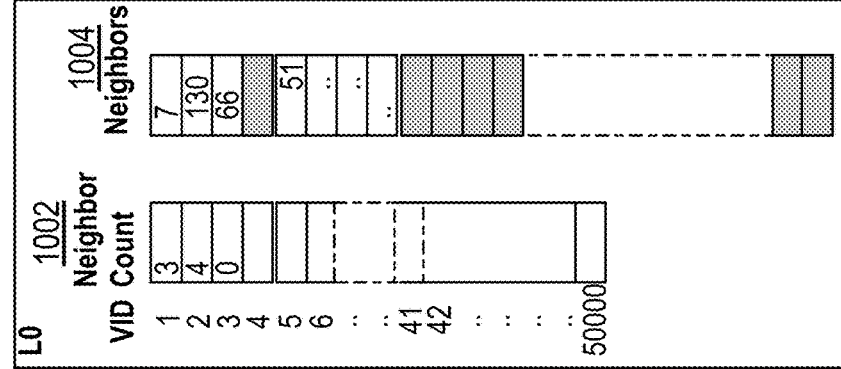
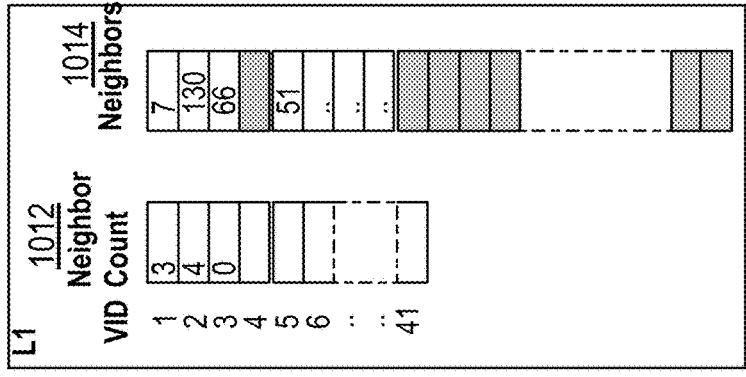
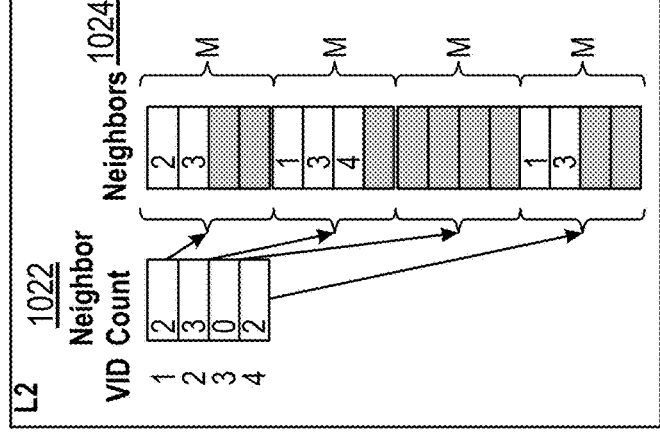
FIG. 10

1200 ⌐

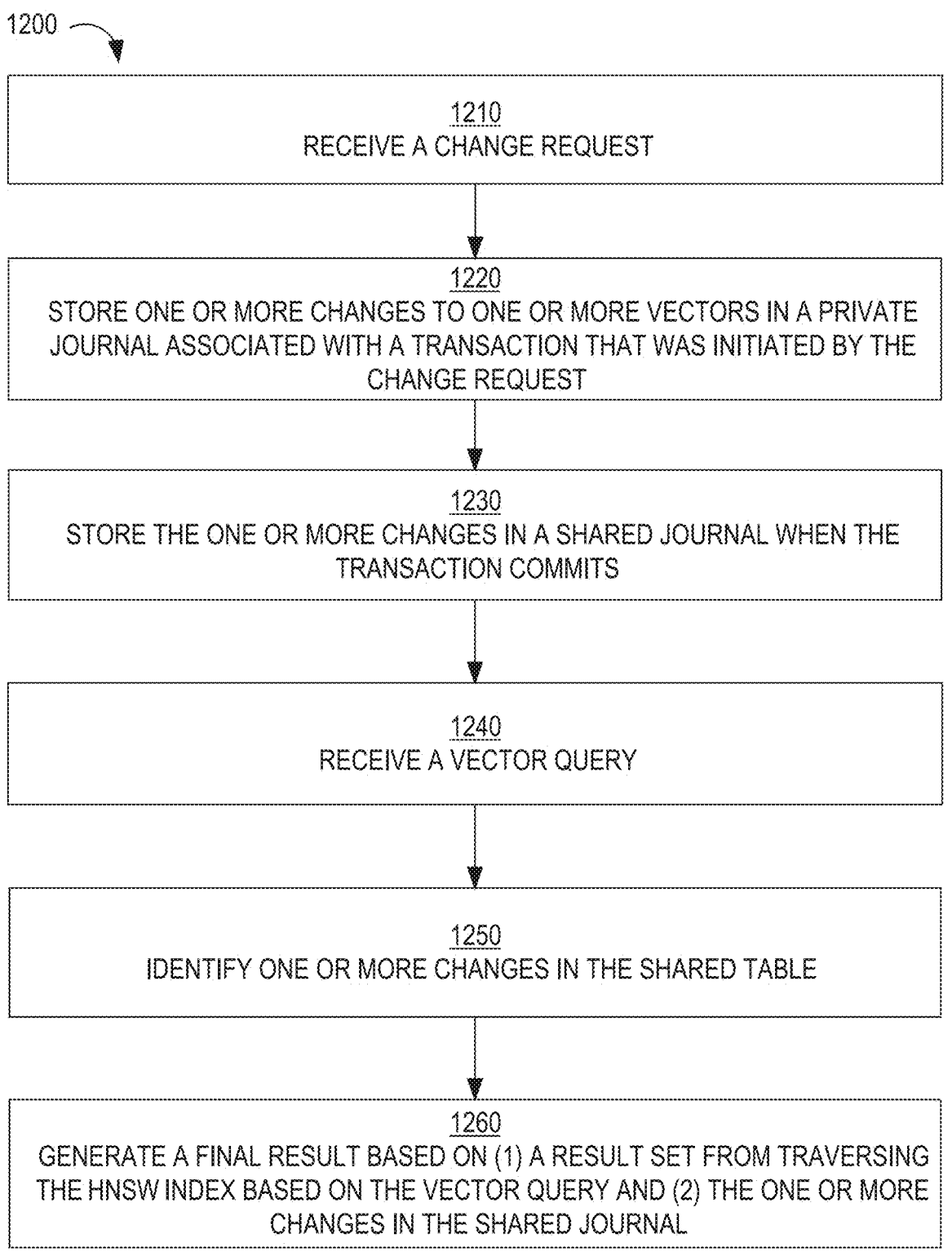

1210
RECEIVE A CHANGE REQUEST

1220
STORE ONE OR MORE CHANGES TO ONE OR MORE VECTORS IN A PRIVATE JOURNAL ASSOCIATED WITH A TRANSACTION THAT WAS INITIATED BY THE CHANGE REQUEST

1230
STORE THE ONE OR MORE CHANGES IN A SHARED JOURNAL WHEN THE TRANSACTION COMMITS

1240
RECEIVE A VECTOR QUERY

1250
IDENTIFY ONE OR MORE CHANGES IN THE SHARED TABLE

1260
GENERATE A FINAL RESULT BASED ON (1) A RESULT SET FROM TRAVERSING THE HNSW INDEX BASED ON THE VECTOR QUERY AND (2) THE ONE OR MORE CHANGES IN THE SHARED JOURNAL

*FIG. 12*

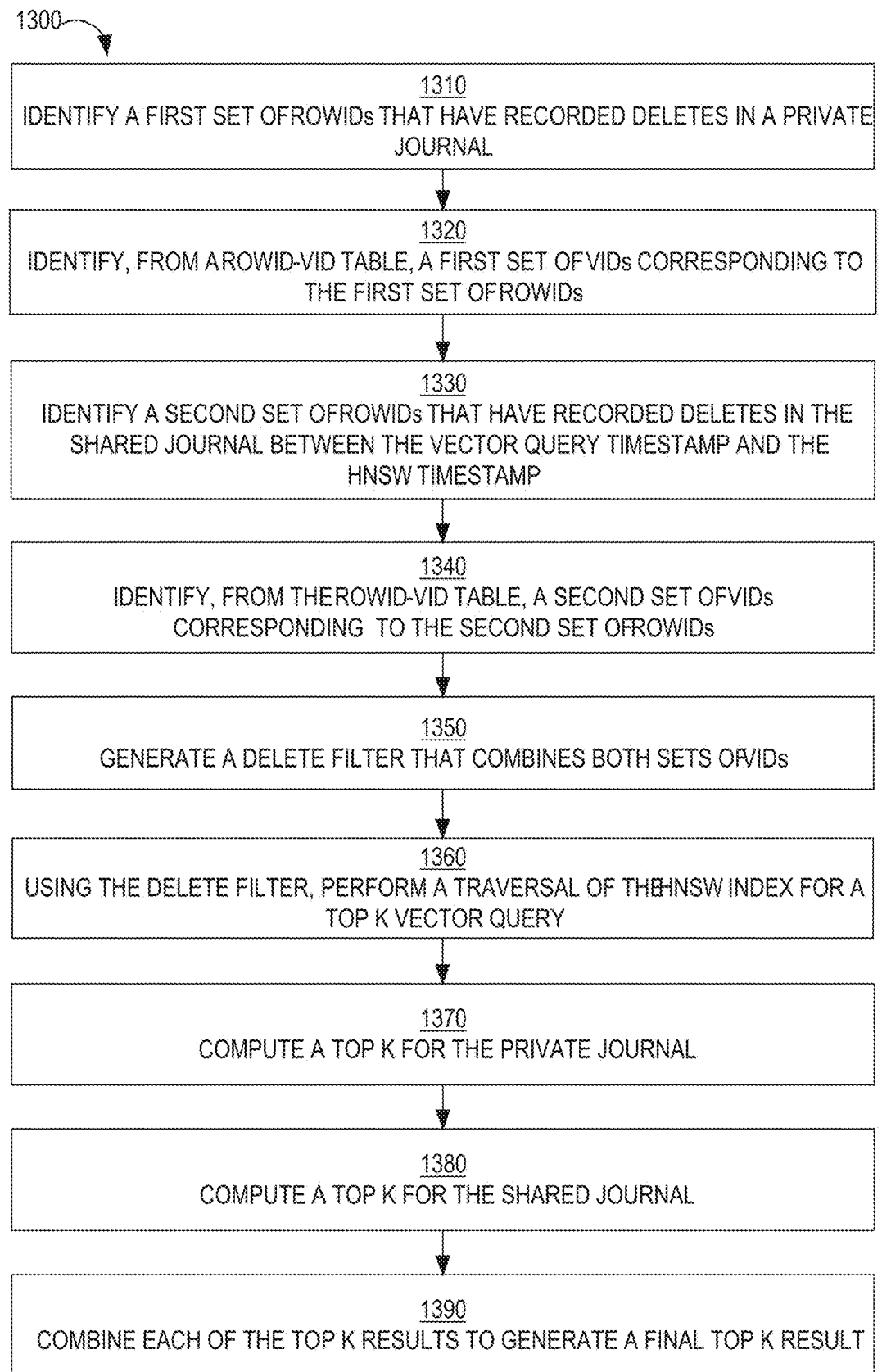

1300

1310
IDENTIFY A FIRST SET OF ROWIDs THAT HAVE RECORDED DELETES IN A PRIVATE JOURNAL

1320
IDENTIFY, FROM A ROWID-VID TABLE, A FIRST SET OF VIDs CORRESPONDING TO THE FIRST SET OF ROWIDs

1330
IDENTIFY A SECOND SET OF ROWIDs THAT HAVE RECORDED DELETES IN THE SHARED JOURNAL BETWEEN THE VECTOR QUERY TIMESTAMP AND THE HNSW TIMESTAMP

1340
IDENTIFY, FROM THE ROWID-VID TABLE, A SECOND SET OF VIDs CORRESPONDING TO THE SECOND SET OF ROWIDs

1350
GENERATE A DELETE FILTER THAT COMBINES BOTH SETS OF VIDs

1360
USING THE DELETE FILTER, PERFORM A TRAVERSAL OF THE HNSW INDEX FOR A TOP K VECTOR QUERY

1370
COMPUTE A TOP K FOR THE PRIVATE JOURNAL

1380
COMPUTE A TOP K FOR THE SHARED JOURNAL

1390
COMBINE EACH OF THE TOP K RESULTS TO GENERATE A FINAL TOP K RESULT

*FIG. 13*

TRANSACTIONALLY CONSISTENT HNSW INDEX

BENEFIT CLAIM

This application claims the benefit under 35 U.S.C. § 119(e) of U.S. Provisional Application No. 63/583,298, filed Sep. 17, 2023, by Chavan et al.; U.S. Provisional Application No. 63/583,259, filed Sep. 16, 2023 and provisional application 63/563,926, filed Mar. 11, 2024, by Lahiri et al., the entire contents of which are hereby incorporated by reference.

RELATED APPLICATIONS

This application is related to U.S. patent application Ser. No. 18/885,630 filed Sep. 14, 2024; U.S. patent application Ser. No. 18/885,636 filed Sep. 14, 2024; U.S. patent application Ser. No. 18/885,639 filed Sep. 14, 2024; U.S. patent application Ser. No. 18/885,640 filed Sep. 14, 2024; U.S. patent application Ser. No. 18/885,645 filed Sep. 14, 2024 and U.S. patent application Ser. No. 18/828,330 filed Sep. 9, 2024, the contents of which are hereby incorporated by reference.

TECHNICAL FIELD

The present disclosure relates to database management of vectors and, more particularly, to providing transactional consistency in a particular type of vector index.

BACKGROUND

A vector is a fixed length sequence of numbers, typically floating point numbers, such as [21.4, 45.2, 675.34, 19.4, 83.24], which is a five-dimensional vector. An embedding is a means of representing objects (e.g., text, images, and audio) as points in a continuous vector space where the locations of those points in space are semantically meaningful to one or more machine learning (ML) algorithms. An embedding is often represented as a vector. Generically, a vector embedding represents a point in N-dimensional space. Vector embeddings are intended to capture the important "features" of the data that the vector embeddings represent (or embed). The data a vector embedding represents can be one of many types of data, such as a document, an email, an image, or a video. Examples of features are color, size, category, location, texture, meaning, and concept. Each feature is represented by one or more numbers (dimensions) in the vector embedding. Hereinafter, a "vector embedding" is referred to as a "vector."

Today, vectors are often generated by machine-learned models (e.g., neural networks) and the features they represent are often difficult for humans to understand. One way that vectors are produced by neural networks is by capturing the outputs of the neurons in the penultimate layer, i.e., the neural network's outputs just before the final processing layer.

Distance Between Vectors

An important attribute of vectors is that the distance between two vectors is a good proxy for the similarity of the objects represented by the vectors. Two vectors that represent similar data should be a short distance from each other in vector space. The opposite is also true: dissimilar data are represented by vectors that are far apart from each other in the vector space. For example, the distance between a vector for the word "cat" and a vector for the word "dog" should be less than the distance the vector for the word "cat" and a vector for the word "plant."

The distance between two vectors is often calculated by summing the squares of the difference between the numbers in each position of the vectors:

$$(Vector1[1]-Vector2[1])^2+(Vector1[2]-Vector2[2])^2+ \ldots$$

The property that vector distance represents object similarity is what allows similar data to be found using a vector database. For example, when a vector representing a picture of a dog is searched for in a vector database, the nearest vectors will be those representing other dogs, not vectors representing plants.

Vector Processing Workloads

Vector processing workloads (not to be confused with SIMD vector processing) have been used in Natural Language Processing (NLP), image recognition, recommendations, etc. Vector processing workloads have two sub-categories that require separate optimization strategies: indexing and searching. Regarding indexing, vector embeddings (or simply vectors) are indexed using approximate indexing techniques. Unlike B-tree indexes, a vector index returns many matching values ranked by similarity. Index creation and rebuild tend to be CPU intensive and are optimized for throughput.

Regarding searching, the stored vectors are searched using a class of algorithms known as "Similarity Search" or "Approximate Nearest Neighbor (ANN)" to find the closest vectors to a query vector. Search is designed to minimize CPU usage in order to minimize response time.

Vector Processing Patterns

A vector similarity search is like interactive online transaction processing (OLTP) in that end-users submit vector queries and expect an instant reply. Vector similarity search requires millisecond response time to finding vectors that are close (represent similar data) even when the database in which the vectors are stored holds billions of vectors. An example query is "find products that are similar to this picture" [reference to a digital image]." Another example query is "find corporate documents that conceptually match this natural language prompt: [NL prompt]."

Providing fast response times requires using specialized vector indexes and fast algorithms for computing distances between vectors. In some use cases, there is a need to combine vector similarity search with relational data. For example, a query may ask for data about houses that match a natural language prompt, are valued at over $1M, are in zip code 94070, and whose owner recently declared bankruptcy. Also, there may be a need to be able to insert new vectors into a database, delete vectors from the database, and index the vectors in real time.

Vector Databases

Early vector workloads often used flat files or object stores to store vectors. An application would read the vectors out of their backend repositories into memory and perform vector processing using third-party libraries, such as FAISS. Generative artificial intelligence (AI) has greatly increased the volume and processing needs for vectors. Generative AI requires support for much higher volume ingest and faster filtering and retrieval. A database with vector capabilities and built-in indexing is important for these applications.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 4 is a flow diagram that depicts an example process for storing multiple versions of a vector into a single vector object, in an embodiment;

FIG. 10 is a block diagram that depicts an example organization of an example HNSW index, in an embodiment;

FIG. 12 is a flow diagram that depicts an example process for recording changes to vectors and leveraging those changes during processing of a vector query, in an embodiment;

FIG. 13 is a flow diagram that depicts an example process for processing an in-transaction read associated with a vector query, in an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for providing a transactionally consistent HNSW index are described. In one technique, changes to vectors that referenced in the HNSW index are tracked and stored in a shared journal table. In response to a vector query that includes a query vector, both the HNSW index is accessed as well as the shared table for any vector inserts. Results from accessing both are combined to generate a result of processing the vector query. If the shared table tracks vector deletions, then IDs of deleted vectors are not returned while accessing the HNSW index. In a related technique, the vector query is part of an in-transaction read that involves reading one or more changes that were initiated by the same transaction. Those one or more changes are stored in a private journal that is only accessible to the transaction and no other transaction.

Vector Database System Overview

Figure 1:
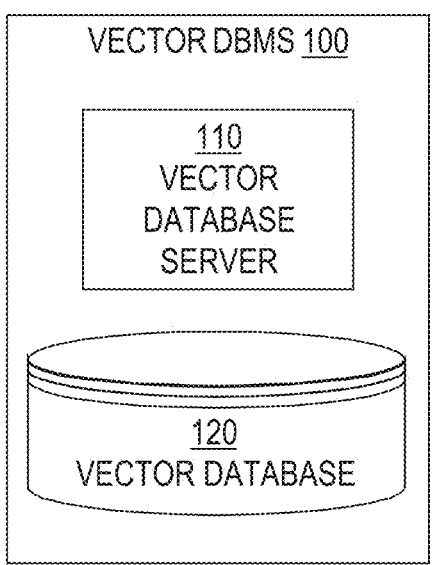
FIG. 1 is a block diagram that depicts an example vector database management system (VDBMS), in an embodiment.

FIG. 1 is a block diagram that depicts an example vector database management system (VDBMS) 100, in an embodiment. VDBMS 100 comprises a vector database server 110 and a vector database 120. Vector database server 110 is communicatively coupled to vector database 120. VDBMS 100 may be deployed in a network of an enterprise or may be deployed in a cloud environment and, therefore, may be accessible to an enterprise over one or more computer networks (e.g., the Internet). VDBMS 100 may be provisioned for an enterprise by a cloud management team of a cloud provider as needed on an enterprise-by-enterprise basis.

Vector database server 110 comprises one or more computing machines, each executing one or more compute instances that receive and process data requests, including data retrieval requests (e.g., queries) and data modification requests (i.e., for vector data modifications), such as inserting vectors, deleting vectors, and updating vectors. A computing instance translates a data request into a storage layer request that the computing instance transmits to vector database 120. A computing machine that hosts at least one compute instance includes (1) one or more processors, (2) volatile memory for storing data requests (and their respective contents) and vector data that is retrieved from vector database 120, and (3) optionally, non-volatile memory.

Vector database 120 may comprise multiple storage devices, each storing vector data and, optionally, one or more non-vector data. For example, vector database 120 stores a table that includes a column for storing vectors and one or more column for storing user data, such as a column for storing a user identifier, a column for storing a user profile, a column for storing user search history, a column for storing user access history, a column for storing user-generated content, etc. In this example, each row in the table corresponds to a user, such as a customer, a subscriber to a service, etc.

Vector database 120 may also store one or more indexes that index content in vector database 120, such as content stored in one or more base tables. Some of the indexed content may be vector-related data (e.g., actual vector embeddings and metadata thereof) and some of the indexed content may be non-vector-related data, such as content in columns that do not store vectors. Thus, at least one index that vector database 120 may store is a vector index, described in more detail herein.

Native Support for Vector Embeddings

In an embodiment, VDBMS 100 provides native support for a new vector embedding ("VECTOR") datatype. The native support may include operators and indexes that are associated with that datatype. Examples of other datatypes that may be natively supported by VDBMS 100 include INT (integer), FLOAT (floating point), DATE, and STRING.

A VECTOR column may be defined with two values: a number of elements/dimensions and a dimension format (or "element type"). A generic example of VECTOR datatype syntax is the following:

VECTOR (<Num Elements>, <Element Type>).

The following is an example is using this VECTOR datatype syntax to create a new table for storing vectors:

```
create table vector_tab (id NUMBER, attributes JSON,
    data VECTOR(768,
        'FLOAT32'))
``` where "id", "attributes", and "data" are names of columns of the table named "vector_tab." The first column in vector_tab is a NUMBER datatype, the second column in vector_tab is a JSON datatype, and the third column in vector_tab is a VECTOR datatype.

Different types of functions may be supported as part of this new VECTOR datatype. Example functions include distance functions, aggregate functions, and single vector functions. An example distance function is "VECTOR_D-ISTANCE (vector1, vector2, <optional distance metric>)." This distance function computes a distance between vector1 and vector2 and is the most common operation forming the basis of similarity search. Distance metrics may be in Euclidean (which may be the default metric), cosine distance (1–cosine similarity), dot distance (negative of dot product), Manhattan, Hamming, etc. This distance function may return different types of values depending on the storage representation. For example, this distance function returns (a) a binary float value if the storage representation is four bytes or less or (b) a binary double value otherwise.

An example of an aggregate function is "VECTOR_AVG (VECTOR)" where VECTOR refers to the column and, thus, this function takes a set of vectors as input. This function computes the average vector across a set of vectors and returns a vector. This function is useful for Word2Vec use-cases (e.g., sentiment analysis across tweets) where every word has a vector and a sentence's vector is computed as the average vector of all words in the sentence or all keywords in the sentence.

Regarding single vector functions, two example functions are as follows: (1) "VECTOR_COUNT_DIMENSIONS (VECTOR)," which counts the number of dimensions in an input vector and returns a number; and (2) "VECTOR_NORM(VECTOR)," which computes the Euclidean norm/length of an input vector and returns a value, such as a BINARY DOUBLE.

The following are examples of queries (in structure query language (SQL) format) using the vector distance function:

```
select id from vector_tab order by VECTOR_DISTANCE(data,
    :query) asc fetch first 5
        rows only;
```

This query compares the query vector (":query") with every vector in the table "tab" (where tab has a column named "data" that stores vectors). While a result of this query is 100% accurate, it is relatively slow.

```
select id from tab t where t.attributes.year.number( ) < 2000
    order by VECTOR_DISTANCE(data, :query)
    asc fetch first 5 rows only;
```

This query results in obtaining the top five photos that are similar to a query photo (":query") that were taken before the year 2000.

```
with query as
    (select id, data from vector_tab where id = :id)
    select t.id from vector_tab t, query q where t.id != q.id order by
    VECTOR_DISTANCE(t.data, q.data) asc fetch first 5 rows only;
```

This query results in obtaining the top five nearest neighbors to a specific vector in a data set (i.e., vector_tab).

```
select id from vector_tab
    where VECTOR_DISTANCE(data, :query, 'MANHATTAN') < 5;
```

This query results in obtaining all neighbors that are within a threshold distance from the query vector (":query"), where the vector distance function specifies a specific distance metric (i.e., Manhattan), thus, overriding the default distance metric.

Vector Storage

Because vectors that are produced by a ML model are of fixed length, an optimal type is used for underlying storage. For example, for vectors that are less than 8K elements in length, RAW may be used, which should handle most use cases. For larger vectors, binary large object (BLOB) may be used. BLOB should not be used for small vectors due to fixed overhead of LOBs. However, whether BLOB or RAW is used has no effect on the user interface.

In an embodiment, additional summary data may be kept within a vector in order to accelerate operations. For example, the squared norm of a vector ($Sum(v^2)$), which is required for distance calculations, may be stored in a header of the vector. A vector may require additional metadata, such as vector version number, whether the vector stores IEEE floats or binary floats, etc.

Vector Datatype: Flexible Type Specification

In an embodiment, the VECTOR datatype is specified with a flexible dimension count and/or a flexible dimension format. Supported dimension formats may include INT8 (1-byte integer), BINARY, FLOAT16, FLOAT32, FLOAT64, and BFLOAT16. An example of a support VECTOR datatype specification is the following:

VECTOR or VECTOR (*, *)

In the above example, both the dimension count and the dimension format are flexible. This allows the greatest flexibility. In this way, if another vector with a different dimension count or different dimension format is generated, that vector may be stored with other vectors of different counts and/or dimensions, without having to change any schema or applications that target vectors that are defined accordingly.

VECTOR (<dimension count>) or VECTOR (<dimension count>, *)

In the above example, the dimension count is fixed, but the dimension format is flexible.

VECTOR (*, <dimension format>)

In the above example, the dimension count is flexible (and could theoretically be any value), but the dimension format is fixed.

VECTOR (<dimension count>, <dimension format>)

In the above example, both the dimension count and the dimension format are fixed. A specific example of using the VECTOR data type when creating a table is the following:

create table vectab (id number, c VECTOR (1024, FLOAT32))

where c is the name of a column of datatype VECTOR.

An advantage of a flexible specification is that API calls are easier, since only the VECTOR name needs to be passed without having to specify number of dimensions and/or dimension format.

Another advantage of a flexible specification is that it allows a user (e.g., a database administrator) to evolve the contents of a VECTOR column over time easily. There are a wide range of embedding models with different dimension counts and dimension formats that can be chosen to vectorize user data. For example, Open AI Text-Ada-002 produces vectors of 1536 dimensions of FLOAT32, Cohere Embed-English-v3.0 produces vectors of 1024 dimensions of FLOAT32, and Alibaba's gte-small-ct2-int8 produces vectors of 384 dimensions of INT8. A user may desire to try out vectors from various models and judge the quality of semantic search results before finalizing a model. Having a flexible specification allows a user to keep the schema consistent while changing the content stored in the vector column.

Often the user may choose to partition the data in a table by some relational attributes and each partition can contain vectors of different dimension counts or formats. For example, a user may choose to partition a BOOKS table by the GENRE column. Certain genres like Fiction or Economics might be more popular than genres like Biography. Books of the more popular genres can be vectorized using higher dimension vectors while less popular genres can be vectorized with lower dimension vectors. Using higher dimension vectors to improve searches implicitly assumes that higher dimensional vectors capture more "semantic information." Thus, higher dimension vectors may be used to find matches to a wider array of user searches.

A disadvantage of having flexible dimension counts is that vector distance computations cannot be blindly performed on a column containing vectors of different dimension counts. For example, in the book genre example above, a user must add a predicate on the GENRE column to ensure that the search vector is being compared with vectors of the same dimension count.

However, vector distance operations may be executed on two vectors of different dimension formats. For example, using a new SQL function VECTOR_DISTANCE( ) a distance computation may be performed between a three-dimensional vector of FLOAT32 and a three-dimensional vector of FLOAT64. The following is an example of a data definition language (DDL) statement, a data manipulation language (DML) statement, and a structure query language (SQL) statement, respectively:

```
create table vectab (c1 vector(3, FLOAT32), c2 vector(3, FLOAT64));
insert into vectab values (TO_VECTOR('[1.15,
2.27, 3.34]', 3, FLOAT32),
    TO_VECTOR('[1.234, 2.234, 3.334]', 3, FLOAT64));
select vector_distance(c1, c2) from vectab;
```

Internally, vectors with the lower precision dimension format are upconverted to the higher precision format and then the distance computation is performed. This ability adds to the advantages of flexibility described earlier.

Vector Datatype: Flexible Storage Format

In an embodiment, vectors are stored in objects, such as large objects (LOBs), an example of which is a binary LOB (BLOB). Storing vectors in LOBs allows for storing large vectors, such as vectors with dimensions up to 65,534 dimensions.

In an embodiment, an object that stores a vector is designed to be self-contained, meaning each vector object contains information about the dimension count and/or dimension format of the corresponding vector. This allows any module or application to examine a vector object and precisely interpret the vector without relying on a separate dictionary/catalog table that describes the datatype.

In a related embodiment, the format of a vector is designed to cache additional metadata that can be used to accelerate distance computations during run-time. One such metadata is the Squared L2-Norm (Euclidean Norm) of a vector, which norm can be used to speed up Euclidean distance calculations. Given two vectors $v1: (x1, y1)$ and $v2: (x2, y2)$, the Euclidean distance between the two vectors is $\sqrt{((x1-x2)^2+(y1-y2)^2)}$. The portion inside the $\sqrt{(\ )}$ can be expanded as: $x1^2+x2^2-2\times1\times2+y1^2+y2^2-2y1^2=(x1^2+y1^2)+(x2^2+y2^2)-2(x1x2+y1y2)=Squared\_Norm(v1)+Squared\_Norm(v2)-2(x1x2+y1y2)$. Thus, for a given query vector, a one-time computation of the Squared Norm may be computed and, if each vector in a table already has the Squared Norm cached, then the distance computation cost is reduced by approximately 10%.

The format of a vector is designed to store the vector's data, including floating point dimension formats, in either IEEE754 format or a proprietary canonical binary float/double format that allows for floating point numbers to be byte-comparable. An example vector format is as follows:

```
[Version # (1B)][Flag (2B)][Num_Dims (1B/2B/4B)][Storage Type
    (1B)][Squared L2-Norm (1B/2B/4B/8B)][Vector Data
    (1B/2B/4B/8B)*num_dims]
``` where each '[ ]' corresponds to a field in a vector, 'B' refers byte, '1B/2B' means that the corresponding field in a vector may be one byte or two bytes in length, 'Num_Dims' refers to number of dimensions, example storage types include FLOAT32 and INT8, and L2-Norm is the Euclidean distance between the vector and the "zero" vector (or origin). Calculating and storing the L2-Norm value within a vector object reduces the time to compute a distance between the vector and another vector.

Versioning of Vectors

An important piece of an AI Vector Search eco-system is the ability to update the embedding model that is used to vectorize (e.g., unstructured) data. As this space is rapidly evolving, it is possible that embedding models of the future produce vectors of different dimension counts and/or different dimension formats. Having a flexible VECTOR column type allows users to update the vector column by replacing vectors from an old model with a new model. While functionally valid, this approach may prove to be expensive, especially for large datasets with hundreds of millions of vectors. In particular, all vectors in the table for a specific column must be updated with vectors from the new model in a single transaction before new searches can leverage them. Such an update could take hours.

Also, users may want to experiment with different embedding models to decide which model's vectors provide the best semantic search quality. One idea is to create multiple columns, one for each embedding model. However, this requires creating multiple versions of the application that references different vector columns in Top K queries.

In an embodiment, multiple versions of a vector are stored in the same object. Storing multiple versions of a vector in the same object addresses problems of both approaches (of (i) replacing old vectors with new vectors and (ii) creating a column for each embedding model). An object may be a LOB (or large object), an example of which is a binary LOB (BLOB). Relatively small vectors may also be stored in RAW columns.

Figure 2:
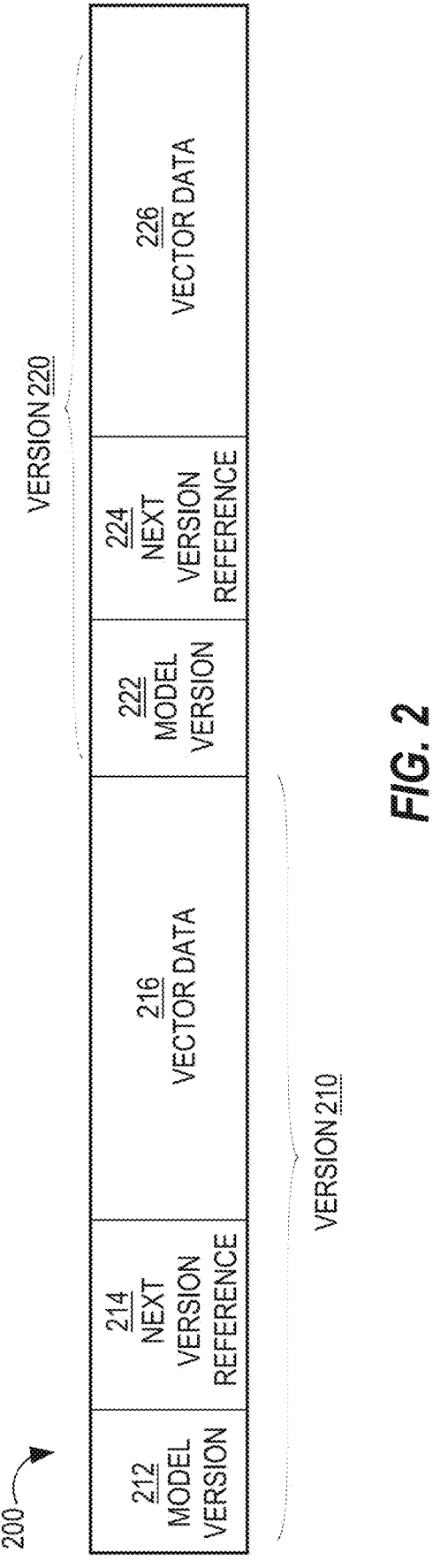
FIG. 2 depicts an example vector object, in an embodiment.

From a storage perspective, there are two main options to store multiple versions of a vector in a single object (e.g., a BLOB): (1) storing the different versions in a linked-list style format within the BLOB format and (2) leveraging vector-only extents. Regarding the first option, FIG. 2 depicts an example vector object 200, in an embodiment. Vector object 200 comprises two versions (210 and 220) of a vector. Data for each version comprises three fields: a model version number, a next version reference that points to the next version in the same object, and the vector data itself of that version. Therefore, data for the first version 210 comprises model version number 212, next version reference 214 (which references version 220), and vector data 216. Similarly, data for the second version 220 comprises model version number 222, next version reference 224, and vector data 226. Vector data 216 stores the embedding data for version 210 while vector data 226 stores the embedding data for version 220.

Thus, a next version reference field stores a value that indicates a location where data about another version is stored. The value may be a byte offset into the version object. The last (in order) version in a vector object may have a value of zero or null in its next version reference field, which value indicates that there are no more versions of the vector that follow that last version.

The model version number of a version may be a number that is automatically set by the process (e.g., a version adding component) that inserts the version into a vector object. The model version number may be a monotonically increasing value. For example, the first version of a vector is assigned model version '0', the second version of the vector is assigned model version '1' and so forth. Alternatively, the model version number may be (a) a value that corresponds to the embedding model that generated the version or (b) a name of that embedding model. In either scenario, vector database 120 stores a mapping (which may be read into memory of vector database server 110) that maps embedding model names/identifiers to their respective model version numbers that are stored in vector objects in vector database 120.

Versioning of Vectors: Retrieving a Version

A version retrieval component retrieves one or more versions of a vector from a vector object. The version retrieval component may be implemented in software, hardware, or any combination of software and hardware. The version retrieval component may be part of a vector database server 110 and may be called by a vector search application. Alternatively, the version retrieval component may be part of a storage sub-layer that is distinct from a database server layer that receives vector search queries. For example, the version retrieval component may be part of vector database 120. The more processing that is pushed to vector database 120, the less data that needs to be transferred to vector database server 110.

The version retrieval component may determine which version(s) to retrieve based on one or more inputs (e.g., from a user or a vector search application). For example, a user specifies which version of a vector is desired, such as "version0," "version1," "3," etc. A version specification may be passed as input to an application that processes versioned vectors.

Additionally or alternatively, the version retrieval component retrieves the most recent version of a vector by default. Thus, no input specifying which version(s) to retrieve may be necessary. In this way, if a user/application does not specify a version number, then it is presumed that the user/application desires the most recent version.

In a related embodiment, new SQL syntax is provided to allow users to specify which version of a vector is desired. For example, the vector distance function may be augmented to allow for flexible version specification, such as the following:

```
VECTOR_DISTANCE(<vec_col1>, <vec_col2>, <distance
metric>, <version number of
    vec_col1>, <version number of vec_col2>)
```

The version numbers may be bind values that an application can change.

Figure 3:
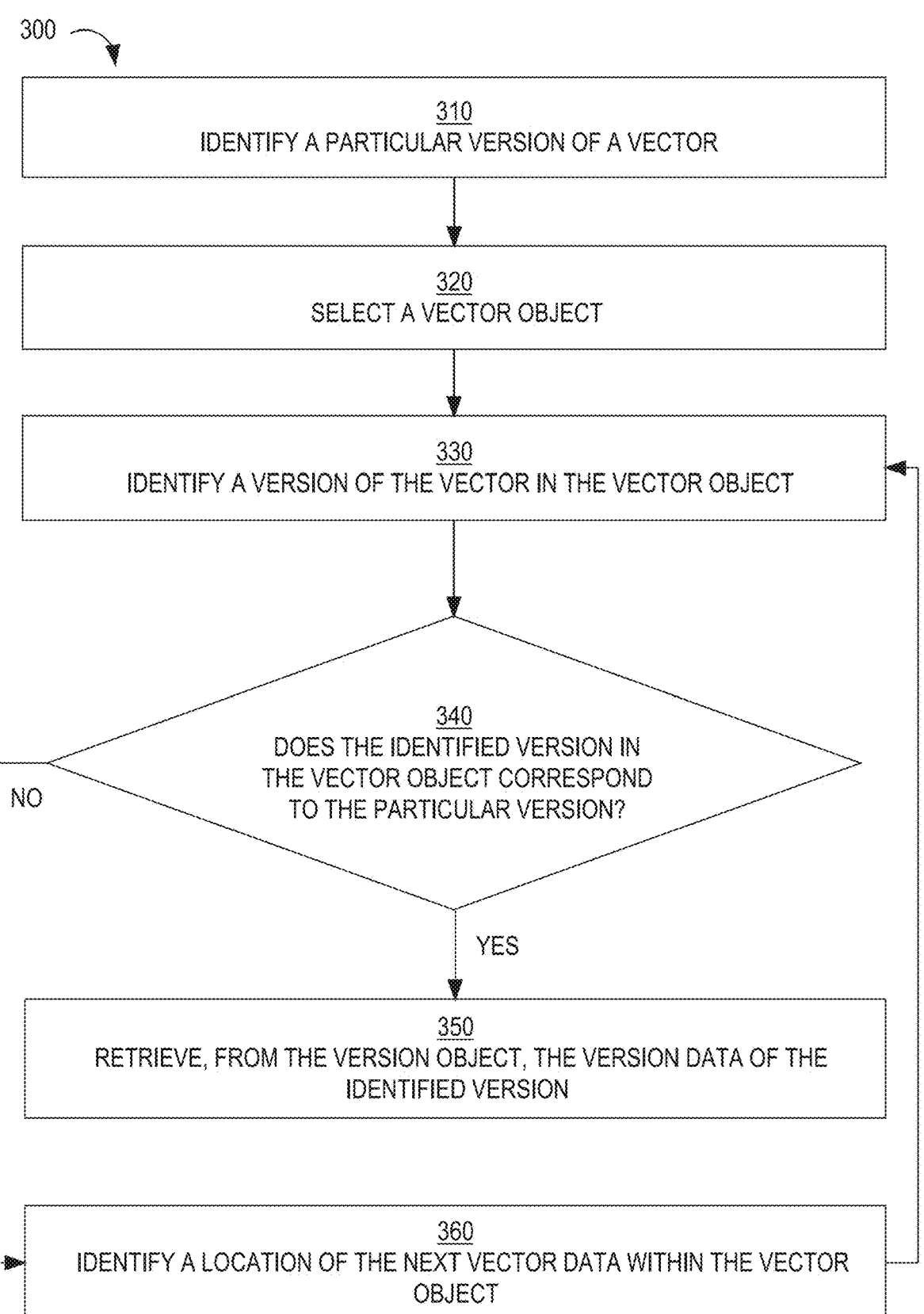
FIG. 3 is an example process for retrieving a version of a vector from a vector object, in an embodiment.

FIG. 3 is an example process 300 for retrieving a version of a vector from a vector object, in an embodiment. Process 300 may be performed by a version retrieval component.

At block 310, a particular version of a vector is identified. The particular version may be specified by a user. Alternatively, the particular version may be a default version, such as the oldest version or the newest (or most recent) version. Different API calls to the version retrieval component may indicate which version. For example, one API call may be associated with a request to retrieve the oldest version of a vector while another API call may be associated with a request to retrieve the newest version of a vector. Alternatively, only a single API call is used to initiate the version retrieval component and one or more values that are passed as part of the API call indicate which version(s) to retrieve.

At block 320, a vector object is selected. Block 320 may involve selecting multiple vector objects. A vector object may be selected based on applying one or more search criteria to one or more columns of a table that stores vectors. Block 320 may be performed before or after block 310.

At block 330, a version in the vector object is identified. The first iteration of block 330 may involve identifying the first version (sequentially speaking) in the vector object. The second iteration of block 330 may involve identifying the next version in the vector object, which is after the first version, using the next version reference field value identified in block 360.

At block 340, it is determined whether the identified version in the vector object corresponds to the particular version that was identified in block 310. Block 340 may involve comparing the particular version (identified in block 310) with the value in the model version field of the identified version. If the determination in block 340 is in the affirmative, then process 300 proceeds to block 350. Otherwise, process 300 proceeds to block 360.

At block 350, the version data of the identified version is retrieved from the version object. The version data may be identified based on (1) first data that indicates an offset into the vector object where the version data begins and (2) second data that indicates a length (e.g., in bytes) of the version data. Thus, the vector data between (a) a first location indicated by the first data and (b) a second location indicated by a combination of the first data and the second data (e.g., first data+second data) is retrieved.

After block 350, if multiple versions of the vector are requested, then process 300 may return to block 310 where another version is identified. For example, a request to the version retrieval component may specify versions 4 and 5 or the second version and the most recent version. Therefore, process 300 may be performed once for each requested version.

At block 360, a location of the next vector data within the vector object is identified. This location may be identified using the value in the next version reference field of the identified version (identified in block 330). Process 300 then returns to block 330. However, if the value in the next version reference field indicates that there are no versions, then process 300 may return an error or return a value indicating that the particular version is not available.

In a scenario where the version retrieval component receives a request to identify and return the most recent version of a vector from a vector object and the most recent version is stored at the beginning of the vector object at a position that is known without having to scan the vector object (e.g., because the first version in a vector object is always stored at offset six bytes from the beginning of the vector object), then identifying the most recent version involves identifying that byte offset into the vector object and returning the bytes between (1) the byte offset and (2) a location identified by the sum of (i) the byte offset and (ii) the length of the vector data of the most recent version.

Versioning of Vectors: Deleting Particular Versions

In an embodiment, a request or instruction is received to delete a particular version of multiple vectors. For example, a software engineer may decide that the embedding model that generated the most recent versions of a set of vectors performed poorly in one or more tests. In order to free up space in non-volatile, or persistent, storage, the most recent versions of the set of vectors are deleted.

Deleting a particular version of a multiple vectors may involve receiving an instruction that indicates the particular version (e.g., the first version or the most recent version or a value that indicates a particular number). The instruction may also specify a table or a column within the table that stores the vectors. In this way, the set of vectors involved may be inferred. For each vector object in the table or column, a version deletion component (e.g., of vector database server 110 or of vector database 120) determines the version in the vector object (logical or physical, which is described in more detail herein) that matches the particular version and either (i) deletes the embedding data of that version or (ii) sets a flag that indicates that the space occupied by the embedding data is reusable. If future versions are expected, then approach (ii) may be preferred since the space has already been allocated.

In a related embodiment, an instruction or request to delete may specify or otherwise indicate multiple versions. For example, an instruction may be to delete versions two and four, or to delete the last two versions.

Versioning of Vectors: Adding New Versions

In an embodiment, adding a new version to a vector object that comprises one or more versions involves appending the new version to the one or more versions. Such adding is efficient with relatively low overhead. Adding a new version may involve traversing one or more next version reference fields in a vector object. For example, once a version object is identified, a version adding component identifies a next version reference field in the data for the first version (sequentially) in the version object. The version adding component uses the value in the next version reference field to identify the second version (sequentially) in the vector object, if the second version exists. This process continues until the version adding component identifies, within the vector object, a next version reference field that contains a value that indicates that there are no more versions in the vector object. The version adding component identifies a position within the vector object to which the new version may be added. That position is the byte that follows the last byte of vector data in the vector object.

In adding a new version of a vector to a vector object, the version adding component also adds a value to a model version number field for the new version, the value indicating the version of a model that generated the new version. The version adding component may also add a value for the next version reference field. When appending a new version to a version object, this value may be zero or null, indicating that there are no more versions after this new version.

However, appending versions to one or more versions in a vector object may cause (due to data block size limitations) the most recent version to be stored in a different data block than the data block that stores the one or more versions. Therefore, when retrieving the most recent version, a version retrieval component must follow one or more references to arrive at the different data block to retrieve that version. Accessing two or more data blocks to retrieve the proper version of a vector may increase latency substantially. Fitting as many versions of a vector into a single data block is preferable for use cases where there is significant traversing of versions involved.

In a related embodiment, a vector object includes a most recent reference field that includes a reference or pointer to the most recent version of the vector represented by the vector object. This most recent reference field may be the first field in the vector object or one of the first few fields in the vector object, which field may be easily and quickly identifiable, such as N bytes from the beginning of the vector object. In this way, retrieving the most recent version of a vector may only require following at most one reference, even though there may be many versions of the vector that are stored in the vector object.

In another embodiment, a new version is prepended to a vector object that comprises one or more versions. Such prepending may require shifting existing contents of the vector object to later offsets or positions within the vector object. Shifting may comprise copying existing contents (e.g., vector data of multiple versions of a vector, model version numbers, and next version reference values) of the vector object, determining a byte offset in the vector object, and storing the copied contents beginning at the byte offset, whether in the same data block or a new data block. Determining the byte offset may involve determining the size (e.g., in bytes) of the new version, determining the size (e.g., in bytes) of any required fields that are to accompany the new version (such as a model version number field and a next version reference field) and totaling/summing those two sizes to compute the byte offset.

Prepending a new version to a vector object also involves generating a value for a next version reference field of the new version and storing that value in that next version reference field. The value in this next version reference field points to the most recent version (before the new version) that was added to the vector object. The first time a version of a vector is stored in the vector object, the value of the next version reference field may be zero or null, indicating that there are no more versions sequentially after the first version is added to the vector object. Thereafter, the value of the next version reference field for the new version may be the size of the new version plus zero or more pre-defined offsets.

Similarly, for inserting vectors, new DDL may be used to specify the version into which to insert the vectors. There are at least two techniques to specify which version is to be updated or retrieved. A first technique is to use a SQL construct to specify which version is of interest. For example, in order to update a value of the fourth version of a vector using JSON-like interpretation, the following statement may be used:

update mytab set veccol=VECTOR_TRANSFORM(veccol, SET '$[4]'='[1.1, 2.2, . . . ]')

As another example, in order to retrieve the third version using JSON-like interpretation, the following statement may be used:

select FROM_VECTOR(VECTOR_VERSION(veccol, '$[3]')) from mytab;

A second technique is to create a DDL that defines the currently accepted version across sessions. For example, in order to make the third version the default version for any application that accesses the corresponding column, the following statement may be used:

alter table mytab modify column (veccol current_version 3);

With this added metadata associated with the vector column, when inserting vectors into that column, the following statement may be used to automatically update vector column payloads to add the third version:

insert into mytab values ('[3.1, 3.2, 1.0]');

The alter table statement above works with reads and writes. Thus, queries on this column will read the third version. The following alter table statements are specifically only for reads and writes, respectively:

alter table mytab modify column (veccol current_read_version 3);

alter table mytab modify column (veccol current_write_version 3);

If an alter table statement sets the version to 3 and there are no versions 1 and 2, then a subsequent insert may simply insert the new payload into version 3 and have implicit NULLs for versions 1 and 2. Alternatively, an error may be thrown in case a vector has no explicit values for versions 1 and 2.

An advantage with this embodiment is that the new vectors can be added in a rolling/online fashion where the application can continue to use old vectors while the new vectors are added over time. For example, a vector column has version 1 for all rows. An application is running searches against version 1. Then, a user (e.g., database administrator (DBA) decides to try out a new embedding model and creates version 2 for all vectors. A parallel session can now generate vectors that get added as version 2 to every row. This can be done in batches of, for example, 100 rows, such that it is not an all-or-nothing decision. The entire table can get version 2 vectors across many transactions. The online nature is highlighted by the fact that the existing application can continue reading version 1 for its searches, even though some (or all rows) have version 2 added. Further, other non-vector transactions can happen concurrently since version 2 can be generated in batches.

Contrast this with a solution where the VECTOR column is not versioned and the DBA must update a non-versioned vector, i.e., all version 1s must be replaced with version 2s. This can be done with an update statement. If the update statement updates all rows in the dataset in a single transaction, then a mechanism of snapshot isolation provides a similar online behavior. All new versions will be part of a single active transaction. Queries will roll it back as part of Consistent Read image construction (because the transaction is active) and can read version 1. (This may be a standard mechanism for allowing reads while DMLs are in progress). Note that this only works if all rows are updated in the same transaction. If this is done in batches, then a situation may arise where rows 1 to 1M (one million) have version 2 vectors and rows 1M to 1B (one billion) have version 1 vectors, resulting in queries having wrong results. However, updating a 1B row table in a single transaction is not conducive for many reasons. The instance could crash before all 1B rows can be updated leading to wasted work. Embedding generation is expensive, both from a time and money perspective. Thus, re-generating the embeddings is not efficient. The transaction needs to keep row locks on modified rows which means no other transactions can modify the same rows (for example, to change a different relational column). Since the entire transaction could be very long, other writes may be stalled in the system, even though reads are fine.

Process Overview

FIG. 4 is a flow diagram that depicts an example process 400 for storing multiple versions of a vector into a single vector object, in an embodiment. Process 400 may be performed, at least in part, by the version adding component, which may be part of vector database server 110 or vector database 120.

At block 410, a first version of a vector is stored in a vector object. The first version may have been generated by a first embedding model (e.g., a neural network) and stored in a row of a table with a column for storing objects of the VECTOR datatype. The vector object may be a BLOB object.

At block 420, a second version, of the vector, is identified. The second version is different than the first version and is not yet stored in the vector object. The second version may have been generated by a second embedding model after the vector object was created and after the first version of the vector was stored in the vector object. Block 420 may involve identifying the second version immediately after the second version is generated.

At block 430, an instruction to store the second version in the vector object is received. The instruction may have originated from a storage application that transmitted the instruction to a vector database server, such as a vector database server 110. Alternatively, the instruction may originate from the vector database server and be received at a storage layer of vector database 120.

At block 440, in response to receiving the instruction, the vector object is identified. The instruction may include a row identifier that uniquely identifies a row in which the vector object is stored. Alternatively, the instruction may include other data (such as a combination of data values) that is used to uniquely identify a row.

At block 450, the vector object is updated to include the second version in addition to the first version. Block 450 may involve appending, within the vector object, the second version to the first version. Alternatively, block 450 may involve prepending the second version to the first version.

At block 460, a value that indicates a location, within the vector object, of the first version or of the second version is inserted into a next version reference field of the vector object. Block 460 may be part of block 450 in that, during the update, other data may be inserted into the vector object. Other data may include this value for a next version reference field, as well as a model version number (or identifier) that identifies (and/or is mapped to) an embedding model that generated the second version.

Vector-Only Extents: Logical Vector Objects

As noted above, there are two main options to store multiple versions of a vector. FIG. 2 depicts a first main option (i.e., a linked-list style format) while vector-only extents are a second main option. An extent is a logical unit of database storage space allocation made up of a number of contiguous data blocks.

In an embodiment, the versions of a vector object may be physically stored in one or more vector extents, where a vector-only extent only contains vector data, including a vector embedding of a version of a vector. Thus, each vector version is stored in blocks allocated for vector-only extents. A vector-only extent might store vector versions from different vector objects. For example, vector-only extent E1 stores {Vector Object #1, Version #1}, {Vector Object #1, Version 2}, {Vector Object #2, Version 2}, and another extent E2 stores {Vector Object #1, Version 3}, {Vector Object #2, Version 1}, {Vector Object #2, Version 3}.

Figure 5:
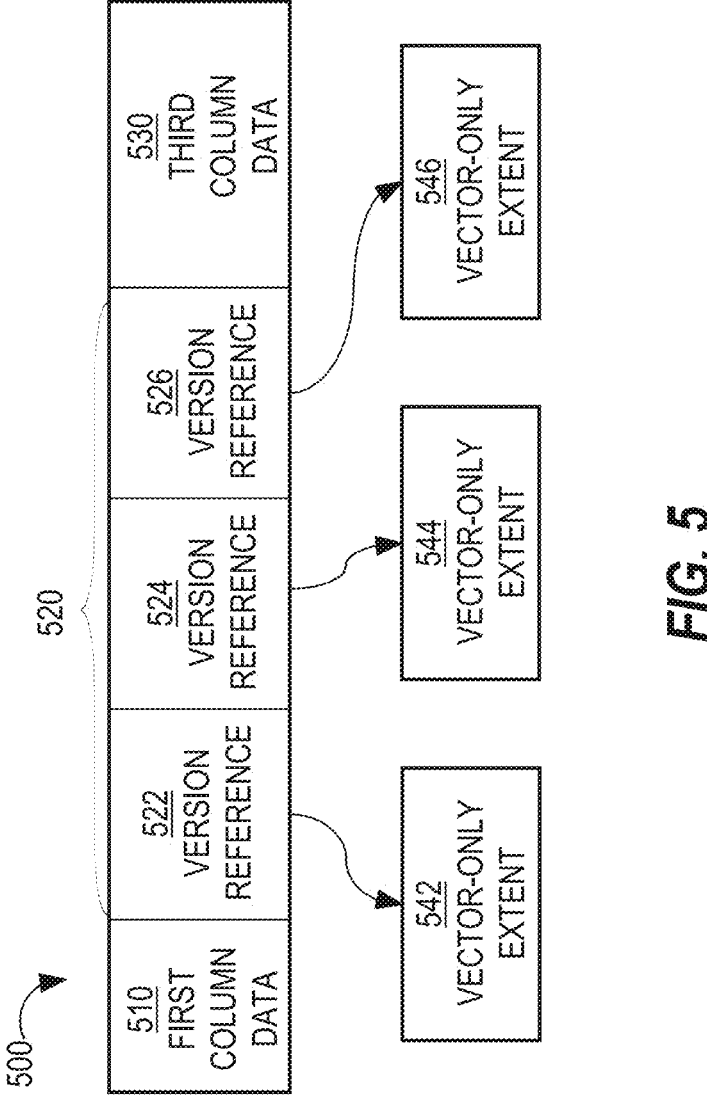
FIG. 5 is a diagram that depicts an example row of a table with a vector column that contains references to versions of a vector, in an embodiment.

FIG. 5 is a diagram that depicts an example row 500 of a table with a vector column 520 that contains references 522-526 to versions of a vector, in an embodiment. Row 500 includes a first column 510 (e.g., a name), vector column 520 (which is the second column in the table), and a third column 530 (e.g., an employment start date). The contents of first column 510 are stored in first column 510, the contents of third column 530 are stored in third column 530, but the vector embeddings associated with vector column 520 are stored in one or more vector objects (or "vector-only extents") that are stored separate from vector column 520. Instead, vector column 520 stores version references 522-526, each referencing a separate version of a vector. Each separate version of the vector is stored in a different (physical) vector-only extent, i.e., vector-only extents 542-546. Thus, a single row in the table comprises contents from first column 510, a set of versions references, and contents from third column 530.

A single vector-only extent may store multiple vector embeddings of one or more vectors. For example, the first two versions of a vector are stored in one vector-only extent, while a third version of the vector is stored in a different vector-only extent.

In this embodiment, vector column 520 does not physically contain vector embedding data (which is stored in vector-only extents 542-546), only non-vector embedding data, such as version references 522-526. Each version reference may be the same fixed size.

In a related embodiment, vector column 520 also stores a model version number for each version reference. These model version numbers may be used by a version retrieval component to identify the requested version of a vector. Similar to the process above for adding new versions of a vector to a vector object, when new versions are added to a logical vector object, version references associated with the versions may be appended to one or more existing version references in the logical vector object, prepended to the one or more existing version references, or added using a different technique.

In this embodiment where a version column contains version references instead of the actual vector embeddings, because many version references may fit into a single column, a version retrieval component must follow at most a single version reference to retrieve a vector-only extent that contains the vector embedding data for a requested version of a vector. When identifying a particular version of a vector, the process that is attempting to read the particular version may scan each version reference sequentially in order to locate the appropriate version reference. Alternatively, the process may know the version number of the particular version and, based on that version number, know which version reference to retrieve without having to scan each version reference sequentially. For example, the process may determine that the version number is '3' and, knowing that each version reference is N bytes, reads the version reference at $(3-1)*N$ bytes from the beginning of the set of version references (where 0 bytes from the beginning of the set of version references is the start of the value for the first version reference).

Vector Queries

A "vector query" is a query that targets one or more vectors in a vector database, such as vector database 120. Vector database server 110 receives a vector query, generates an execution plan for the vector query, and processes the execution plan in order to retrieve one or more vectors from vector database 120. A vector query typically includes a "query vector" and, optionally, one or more other search criteria. A query vector is a vector that vector database server 110 uses to identify one or more vectors in vector database 120. Examples of one or more other search criteria include dates, numbers, strings, etc. For example, a vector query may ask for the top five matching vectors that are associated with the state of California and a date range between Feb. 1, 2024 and Mar. 5, 2024. Such other search criteria may comprise data from columns that are part of the same table that includes the vector column that stores the vectors that the vector query targets.

In order to identify vectors that are similar to a query vector, vector database server 110 may compare the query vector to each vector stored in vector database 120. However, comparing a query vector to each vector in vector database 120 may take a significant amount of time that users are not willing to wait in order to receive an answer. Also, performing such a naïve scan of vector database 120 given a query vector may require a significant amount of computer resources that could be used for other tasks. To address these problems, a vector index may be generated and used in query vector processing.

Vector Indexes

Currently, similarity searches are often performed on data sets with billions of vectors (i.e., vector embeddings). For example, the Deep1B dataset contains 1 billion images generated by a Convolutional Neural Network (CNN). Computing VECTOR_DISTANCE with every vector in the corpus to find Top-K matches at 100% accuracy is very slow. As a result, approximate vector indexes are used to trade-off search quality (recall/accuracy) for search speed.

Vector indexes tend to group data based on vector similarity with the search restricted to a few groups, achieving significant data pruning. Vector similarity is defined in terms of vector_distance( ) calculations. A goal is for a vector index to fit in memory (as opposed to only in slower, long-term (e.g., non-volatile) storage, such as disk) to allow for fast traversals and scans. With modern techniques and memory capacities, a index for billions of vectors can fit into volatile memory. Memory in modern computing machines is large enough for all but the largest workloads of giant web companies.

Two types of vector indexes that may be used to index vectors include Hierarchical Navigable Small Worlds Index (HNSW) and Inverted File Index (IVF). HNSW is an in-memory graph that is fast and relatively accurate, but it is larger in size than IVF. IVF is slower and less accurate, but it is smaller in size. Product Quantization (PQ) is a lossy compression technique that may be used to reduce the size of a vector index so that the index may fit into memory or be scanned faster. However, a tradeoff of PQ is lower accuracy. HNSW and IVF may be combined (with or without PQ) to optimize both speed and size.

Vector Index: IVF

An IVF index is based on K-means clustering or partitioning. A K-means clustering algorithm is applied to a set of vectors to generate K partitions. The value of K (or the number of partitions) may be based on the number of vectors. For example, K=sqrt(N), where N is the number of vectors. Each partition is identified by a centroid, which is a value that is conceptually the average of the vectors that are assigned to that partition. The centroid of a partition may be considered the "center of gravity" of the partition. 1 A goal in determining a centroid is to minimize a total distance between vectors within a partition and their centroid, so that each centroid is a good representative value for its partition.

Figure 6:
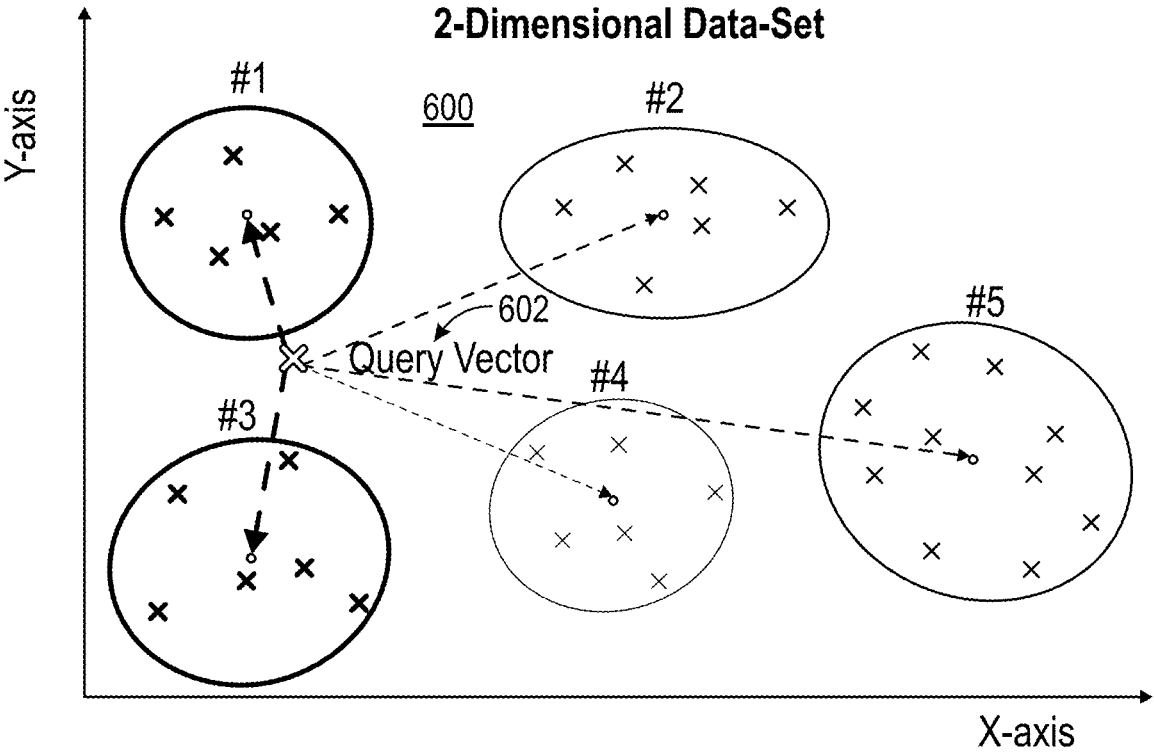
FIG. 6 is a diagram that depicts an example set of five clusters that is generated based on a clustering algorithm, in an embodiment.

FIG. 6 is a diagram that depicts an example set of five clusters 600 that is generated based on a clustering algorithm, in an embodiment. In this example, vectors are two-dimensional and, therefore, may be mapped onto a two-dimensional plane with an X-axis and a Y-axis. However, some vectors may have hundreds of dimensions. FIG. 6 also depicts a query vector 602 that is not in any of the five clusters 600.

An IVF index comprises two types of tables: (1) a centroid table that stores all the centroids of all the partitions; and (2) K partition tables, each of which stores the vectors that are assigned to that corresponding partition based on closeness to the centroid represented by the partition. In a similarity search, given query vector 602, the centroid table is searched first (referred to as the "first-level search") to identify one or more centroids that are the most similar to (or has the lowest distance to) query vector 602. Thus, either only a single centroid is selected from the centroid table or multiple centroids are selected from the centroid table. The number of centroids to select may be a default value (e.g., two) and/or may be based on vector distance from the query vector. (For example, select the closest three centroids that are within D vector distance from the query vector.) In the example of FIG. 6, a vector distance calculation is performed for each pair of vectors, each pair comprising query vector 602 and a different centroid of clusters 600. Because there are five clusters 600, five pairs are considered and five distance calculations are performed.

Figure 7:
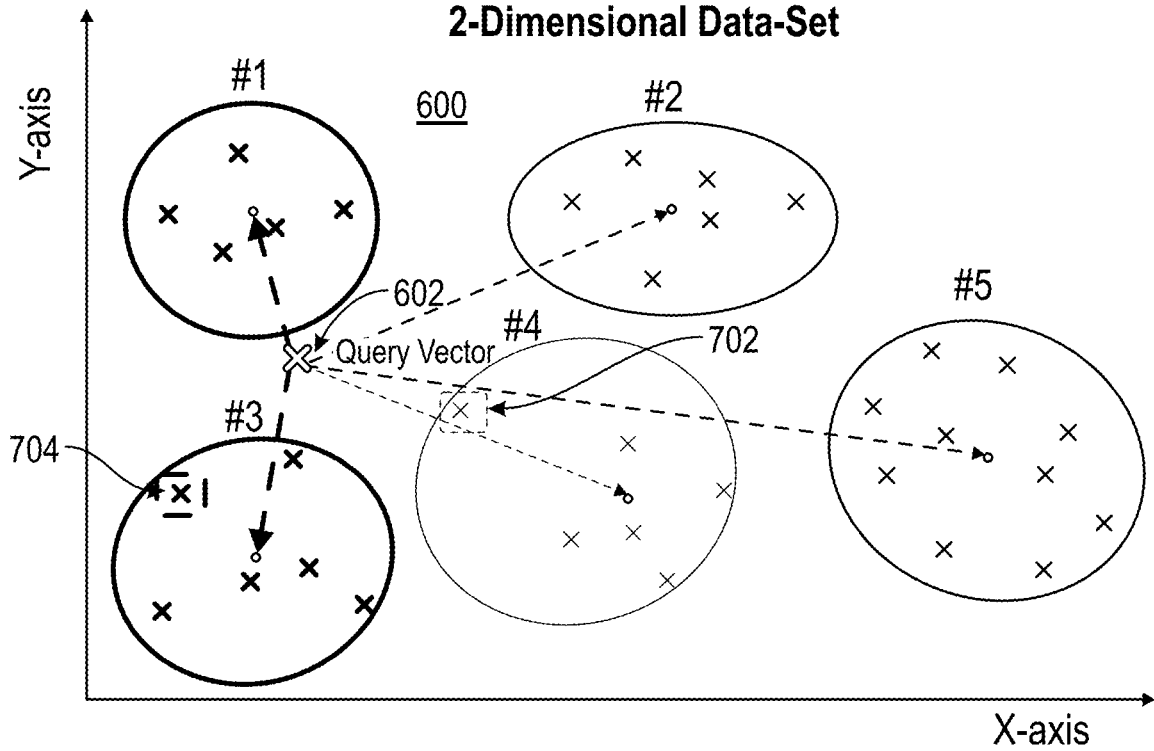
FIG. 7 is a diagram that depicts a subset of clusters that are selected based on distance calculations between query vector and centroids in clusters.

FIG. 7 is a diagram that depicts a subset of clusters that are selected based on distance calculations between query vector 602 and centroids in clusters 600. In this example, two clusters are selected, which may be due to a threshold distance that each distance between a query vector and a corresponding centroid must be under in order to be considered a candidate cluster to search. Additionally or alternatively, two clusters are selected due to a pre-defined number of centroids to select ("n-probe"). In this example, the centroids in clusters #1 and #3 are selected from among the five centroids in clusters 600. However, because cluster #4 is not part of the second-level search, vector 702 cannot be considered a candidate vector. Also, vector 704 can be selected as a candidate vector, even though vector 702 is closer to query vector 602 than vector 704.

Then, for each selected centroid, the partition to which that identified centroid belongs is searched to identify one or more vectors. This search is referred to as a "second-level search." If the query vector is for the Top K, then the Top K vectors in each identified partition are identified and then the Top K from the Top K of each identified partition are selected. Even if the query vector is closer to a centroid associated with one partition, the closest vector to the query vector may be in another partition. Thus, searching one partition might not be sufficient for an accurate search; searching multiple partitions is generally prudent.

However, in an embodiment, the closer that a query vector is to the closest centroid, the fewer partitions are considered in the second-level search. A measurement of closeness of a query vector to the closest centroid may be based on one or more distances between the query vector and one or more vectors in the partition of the closest centroid and/or one or more other centroids. For example, if a query vector is over three times closer to the closest centroid than to a particular centroid, then the partition that corresponds to the particular centroid is not searched in the second-level search, neither any partition whose centroid is farther from the query vector than the particular centroid. As another example, if a query vector is closer to the closest centroid than the query vector is to over 50% of the vectors in the partition that corresponds to that centroid, then no other partition is searched.

Vector Index: HNSW

HNSW is a multi-layer in-memory graph index that has relatively high speed and accuracy relative to IVF and other vector indexes. The graph index comprises vertices, each vertex corresponding to a vector. The lowest layer of the graph contains vertices of all of the vectors in the indexed data set. Higher layers of the HNSW index have a decaying fraction of the vertices in the layer below. In each layer, vertices are connected to their approximate M closest neighbors using edges that are used to walk the graph. At the lowest layer ("layer 0"), the number of neighbors of each vertex may be different than the number of neighbors of each vertex at higher layers, such as 2M. The vertices at higher layers are on average much farther from each other (relative to lower layers) and, therefore, allow traversal of long distances.

Two major parameters for HNSW index construction are M and R. "M" is referred to as the "neighbor count" and is the number of neighbors that each vertex is connected to on each layer. Layer 0 (the lowest layer) may have double that number (e.g., 2M neighbors). A probability distribution function may be defined based on M in order to determine whether a vertex is to be inserted in a layer that is above the lowest layer. The probability distribution function is such that probabilities decay with higher layers. When the probability drops below 1e-9, then no more layers are added. An example probability distribution function is $$p(\text{Layer}) = (1 - 1/M)/M^{\wedge}\text{layer}$$

Regarding parameter R, when a new vertex (corresponding to a new vector) is inserted into an HNSW index, a random number R between [0.0, 1.0] is generated. A new vertex is always inserted into layer 0. A new vertex is inserted into higher layers up to layer "i" if:

$$R > p(i-1) + p(i-2) \ldots + p(0)$$

In an example, with M=10, if R=0.991, then the new vertex is inserted in layers 0 and 1.

An HNSW parameter that is used only for construction is referred to as "efConstruction" and refers to the number of vertices to consider within a layer when looking for the closest M vertices (or closest 2M vertices in layer 0) to which to connect a new vertex. Larger values for this parameter improve index quality but slow down construction. An example value for this parameter is 2M (or 4M for layer 0).

An HNSW parameter that is used in searching is referred to as "efSearch" and refers to the number of vertices to remember in each layer when searching for the K nearest neighbors in a top-K search. Larger values of this parameter improve search quality but slow down searches. An example value for this parameter is 2*K (or double the number of desired K matches).

Figure 8:
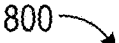
FIG. 8 is a diagram that depicts an example logical representation of an HNSW index 800 that comprises four layers, in an embodiment.

FIG. 8 is a diagram that depicts an example logical representation of an HNSW index 800 that comprises four layers, in an embodiment. An index search begins from an entry vertex 810 in the top layer (layer 3) and traverses edges looking for the vertex, in that layer, whose vector is nearest query vector 802. If M is 32, then 33 distance calculations are performed between query vector 802 and (i) the vertex of entry vector 810 and (ii) 32 neighbors of entry vector 810. The search process does not only consider neighbors of the entry vector 810, the search process finds the closest neighbor and computes distances for its neighbors as well. This process continues until all the neighbors of a vertex are further from the query vector than the vertex that was used to arrive in that neighborhood. Once the closest vector to query vector 802 in a layer is found (i.e., vertex 812 in this example), the search continues starting with that vertex in the next layer down. This process repeats for each intermediate layer of HNSW index 800. (Thus, vertex 822 is selected in layer 2 and vertex 832 is selected in layer 1.) The index search completes in the lowest layer (i.e., layer 0) by considering the (e.g., 2M) neighbors of vertex 832, in the lowest layer, whose vectors are closest to query vector 802.

For traversing the lowest layer, two heaps are maintained: a candidates heap and a Top K heap. The candidates heap stores vertices that are candidates for further exploration and are ordered based on distance to the query vector. The Top K heap stores the current best Top K result set so far. The Top K heap holds efSearch vertices. The search proceeds as follows. Vertex 832 is at the top of the candidates heap and all its 2M neighbors are below it in the candidates heap, ordered by distance to query vector 802. Vertex 832 is selected and compared against all vertices in the Top K heap (which is initially empty). The goal is to check whether a vertex popped from the candidates heap can beat the worst vertex (in terms of distance to the query vector) from the Top K heap (which is also a priority queue ordered in reverse, i.e. furthest vertex among the efSearch vertices is at the top of the Top K heap). If the best candidate vertex beats the worst vertex from the current Top K heap, then the best candidate vertex is added to the to the Top K heap and the worst vertex is removed from the Top K heap. The search continues, meaning more candidates are explored. When vertex 832 is selected, the Top K heap is empty, so vertex 832 is automatically added to the Top K heap.

In a scenario where the Top K heap is full (i.e., it contains efSearch vertices), when a vertex V is selected from the candidates heap, the worst vertex in the Top K heap is replaced by V if V beats that worst vertex. All neighbors of V are then added to candidates heap and ordered within the candidates heap, and the next best vertex in the candidates heap is selected and the search continues. The search terminates if the current best candidate in the candidates heap cannot beat the worst vertex in the Top K heap. Increasing efSearch gives us accuracy because it is more likely for a candidate vertex to be better than the worst vertex in a set of one hundred vertices in the Top K heap than for the candidate vertex to be better than the worst vertex in a set of ten vertices. Thus, with larger values of efSearch, the exploration goes on longer.

Vector Index: HNSW Sizing

HNSW is best to use (compared to IVF) if the HNSW index fits in the memory of one server or computing device. The size of an HNSW index is dominated by layer 0. (Higher layers decline rapidly.) Layer 0 includes a vertex for each indexed vector and two vector identifiers (referred to herein as "VIDs") for each edge connecting two vertices. Each VID may comprise four bytes.

For N vectors of size S with M neighbors each, the index size may be computed as follows:

$$\text{Index Size} =$$

$$\text{Total Size of Vectors} + \text{Total Size of Edge Metadata} = N * (S + M * 8)$$

The following table shows sample index sizes for an HNSW index that is based on one hundred million vectors.

| # of Dimensions | # of Neighbors | Index Size (GB) |
|---|---|---|
| 512 | 16 | 203 |
| 512 | 32 | 215 |
| 512 | 64 | 239 |

-continued

| # of Dimensions | # of Neighbors | Index Size (GB) |
| --- | --- | --- |
| 1024 | 16 | 394 |
| 1024 | 32 | 406 |
| 1024 | 64 | 430 |
| 2048 | 16 | 775 |
| 2048 | 32 | 787 |
| 2048 | 64 | 811 |

Thus, for a server with two terabytes of memory, the maximum number of vectors the server can store are approximately one billion vectors (of 512 dimensions each, each vector with 32 neighbors), five hundred million vectors (of 1024 dimensions each, each vector with 32 neighbors), and two hundred and fifty million vectors (of 2048 dimensions each, each vector with 32 neighbors).

HNSW: Example Storage Architecture

Figure 9:
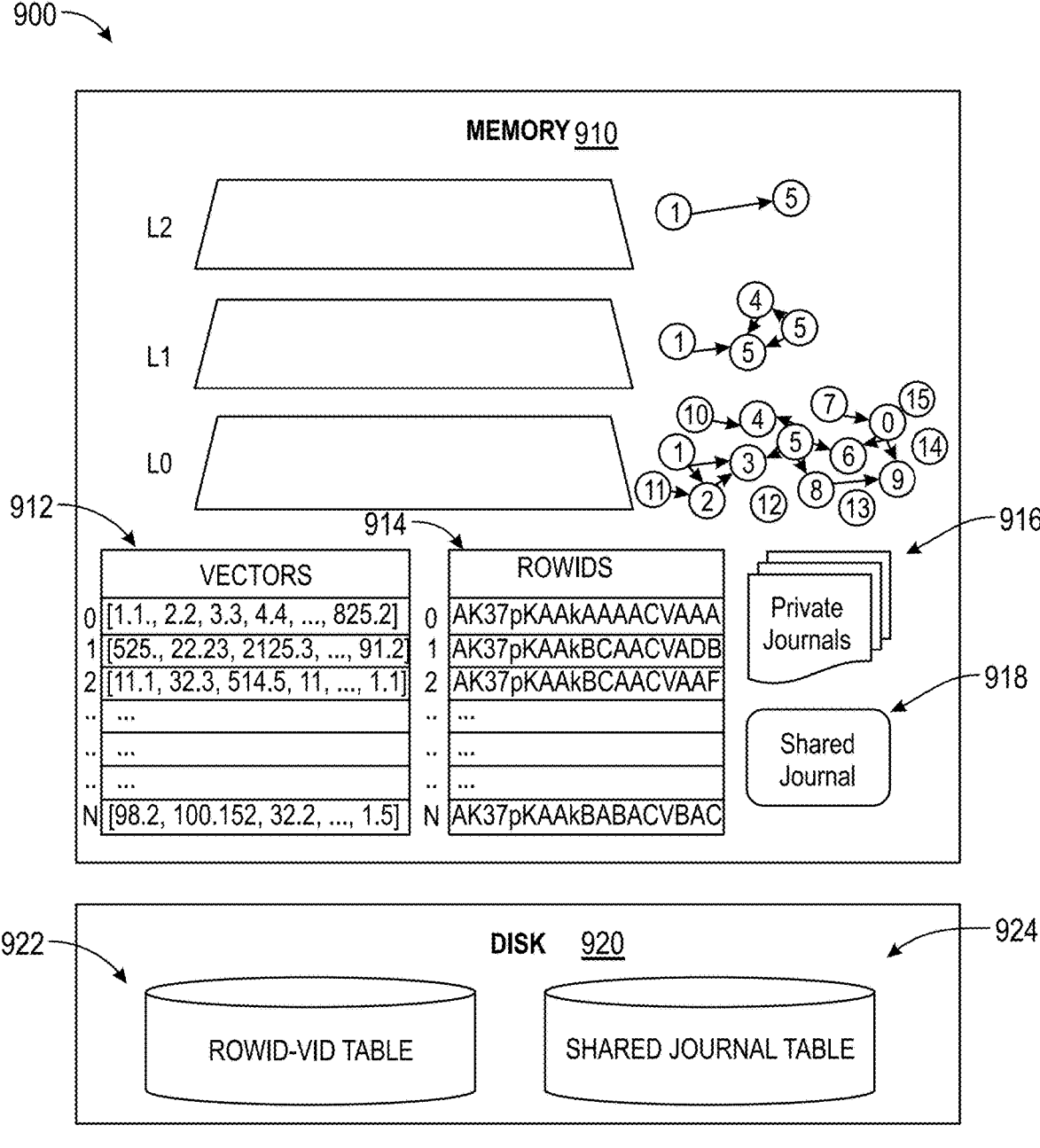
FIG. 9 is a block diagram that depicts an example storage architecture for storing an HNSW graph, in an embodiment.

FIG. 9 is a block diagram that depicts an example storage architecture 900 for storing an HNSW graph, in an embodiment. Storage architecture 900 includes memory storage 910 and disk storage 920. Memory storage 910 is part of vector database server 110 and may be on a single compute instance or may represent the memory of multiple compute instances. Similarly, disk storage 920 is part of vector database server 110 and may be part of a single compute instance or may represent persistent storage of multiple compute instances.

Memory storage 910 stores layers 0-2 of an HNSW index along with a vertex vector map 912 (which is different than the base table), rowid table 914, private journals 916, and shared journal cache 918. Vertex vector map 912 comprises multiple rows, each row containing a vector and each row being associated with an index value that uniquely identifies a position within vertex vector map 912. Rowid table 914 comprises multiple rows, each row containing a row identifier and each row being associated with an index value that uniquely identifies a position within rowid table 914. The index position is the vertex ID (VID).

Multiple private journals 916 indicate that there are multiple pending transactions that have not yet committed, each private journal corresponding to a different pending transaction. Private journals 916 store data about vector modifications that are initiated by DML (data manipulation language) statements, such as inserts, deletes, and updates. Each of private journals 916 exists as long as a vector modification has not yet committed. At commit, one or more changes initiated by a DML statement are stored in shared journal table 924 in disk storage 920 (and, optionally, in shared journal cache 918) Periodically, or in response to certain events occurring or one or more criteria being satisfied, the contents of shared journal table 924 are applied to the HNSW index and vertex vector map 912. Thus, shared journal table 924 allows changes to the HNSW index to be buffered and to be applied to the HNSW index at a later time. Shared journal table 924 may also be used to allow "as of" vector queries, which is a vector query that asks for the state of the vector data "as of" a particular point in time in the past, but after the build/creation time of the HNSW index.

Shared journal cache 918 (1) enables transactionally-consistent queries involving vector search, (2) allows for delayed maintenance of the HNSW index, and (3) provides persistence for unapplied changes to the HNSW index, which enables faster restart after compute instance crashes. Regarding (1), the HNSW index and the shared journal cache 918 (and private journals 916 for in-transaction queries) always contain the changes to the set of indexed vectors since the creation of the HNSW index. Regarding (2), the HNSW index is best maintained in large batches of changes and shared journal cache 918 acts a buffer of changes, thus, giving flexibility in the timing of HNSW index maintenance operations. Shared journal cache 918 may also be used for journaling during online creation of the HNSW index. Regarding (3), the HNSW index may be periodically persisted to persistent (non-volatile) storage using a checkpoint mechanism. Also, because shared journal cache 918 is persisted to shared journal table 924, changes are guaranteed to be persisted from the HNSW checkpoint SCN to the latest committed vector changes. Thus, upon restarting a compute instance after a crash, the HNSW index may be restored to memory from the checkpointed image, and the changes from shared journal table 924 may be applied to the restored image in a lazy manner.

Disk storage 920 also stores ROWID-VID table 922 which is a mapping table that maps rowids to vector IDs. The mapping table may be used to identify vectors that are deleted or those vectors that pass an attribute filter, described in more detail herein. One reason for using VIDs instead of rowids in a vector index is because VIDs are much smaller in size than rowids.

HNSW: Example Data Implementation

FIG. 10 is a block diagram that depicts an example organization of an example HNSW index 1000, in an embodiment. In this example, HNSW index 1000 comprises three layers, layers 0-2. Each layer stores data about a set of vertices and contains a neighbor count array for the set of vertices and a neighbors array for the set of vertices. Thus, layer 2 includes a neighbor count array 1022 and a neighbors array 1024. Each entry in neighbor count array 1022 corresponds to a different vector that has been assigned to layer 2. Each position of neighbor count array 1022 is an index value that points to a position within vectors array 1030, which stores vector embeddings for the vertices in layer 0. Thus, the first position in neighbor count array 1022 corresponds to the vector in the first position of vectors array 1030, the second position in neighbor count array 1022 corresponds to the vector in the second position of vectors array 1030, and so forth. The same is true for neighbor count array 1012 and neighbor count array 1002. As FIG. 10 indicates, the number of vertices assigned to each layer increases from the top-most layer to the bottom-most layer. Also, a vertex that appears in a top layer (e.g., vertex with Vector ID 1) or in an intermediate layer also appears in each layer below that layer.

In an embodiment, vectors array 1030 is constructed by assigning VIDs to vertexes during their respective insertion into a layer of HNSW index 1000. Thus, the vertices (and, thus, their corresponding vectors) that are assigned to the highest layer will have lower VID/position numbers (and will be inserted first into HNSW index 1000) relative to vertices that are assigned first to a lower layer.

Each entry in neighbor count array 1022 includes a value that indicates a number of neighbors that the corresponding vertex has been assigned during the index construction phase. Each ("referencing") entry in neighbor count array 1022 also references or points to an ("referenced") entry in neighbors array 1024 where at least one neighbor of the corresponding vertex is identified. That referenced entry may be the first entry of a set of entries that correspond to the neighbors of the referencing entry. Because each vertex has at most M neighbors, the remaining neighbors of the corresponding vertex are listed in entries subsequent to that first referenced entry, up to M-1 entries away from the first entry. As the example of FIG. 10 indicates, some vertices may have less than M neighbors.

Neighbors array 1024 includes vector IDs of neighbors of vertices indicated in neighbor count array 1022. While neighbors array 1024 is presented as a single array, neighbors array 1024 may be implemented as a single array or as multiple smaller arrays (e.g., of size M) but are concatenated together for ease of description.

HNSW: Updates to HNSW Index

After an HNSW index is built, one or more changes may be made to the underlying vector data. Such changes may be initiated by DML statements. As described herein, one way to process the one or more changes is to buffer those changes by storing the changes in a separate table, such as shared journal table 924. Eventually, it becomes necessary to apply those changes to the HNSW index. Another way to process the one or more changes is to apply the changes immediately to the HNSW index, without buffering. However, immediately applying changes made by a transaction means that the transaction "pays" the overhead of maintenance, thus slowing down the transaction. Regardless of which approach is used to process changes, whether in batches or incrementally as the changes are received, it is preferred to not rebuild the HNSW index "from scratch," since that is an expensive operation in terms of time and resources.

Figure 11:
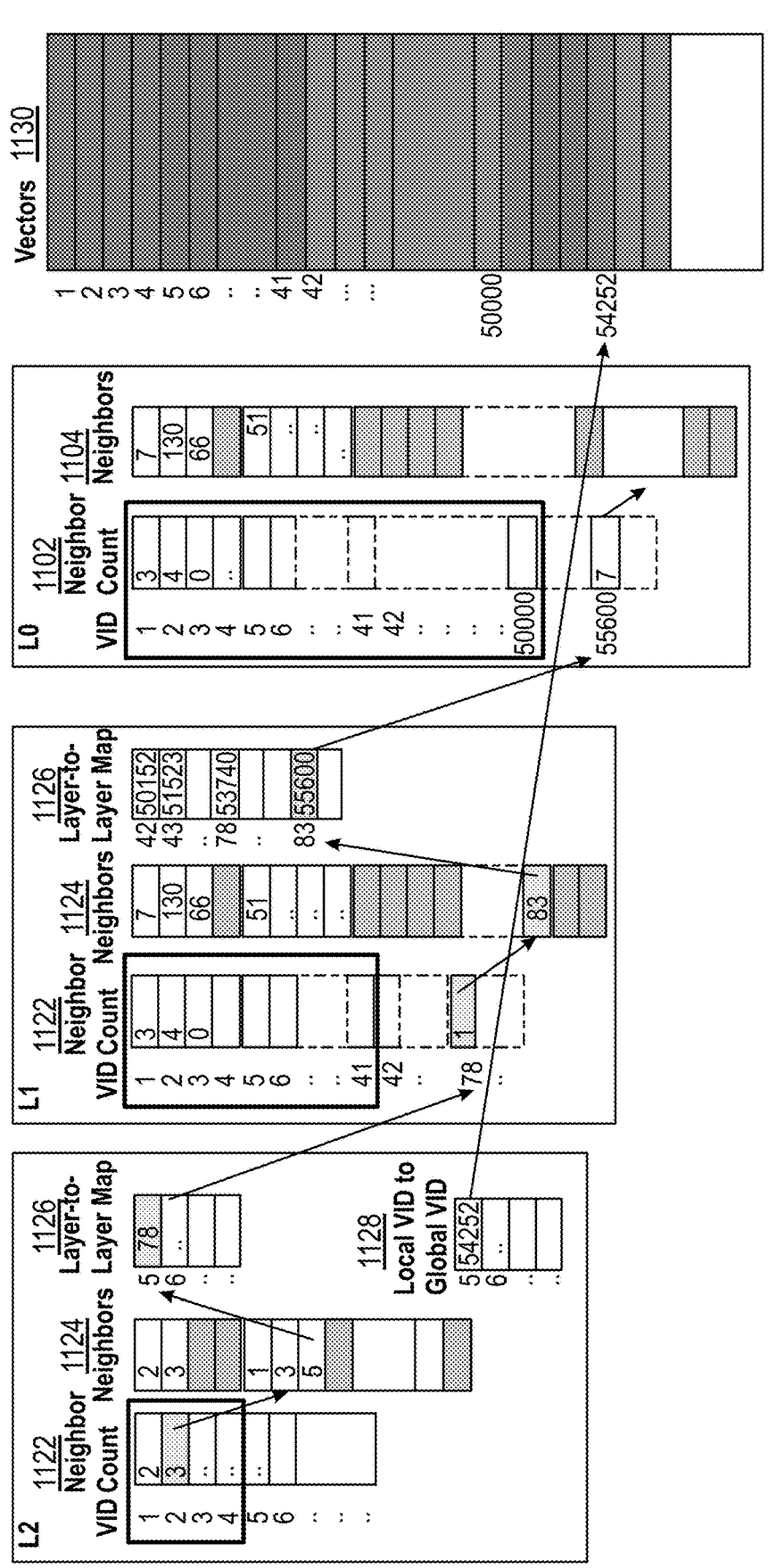
FIG. 11 is a block diagram that depicts an updated version of HNSW after multiple inserts have been made into that index, in an embodiment.

FIG. 11 is a block diagram that depicts an updated version of HNSW 1000 after multiple inserts have been made into that index, in an embodiment. HNSW 1100 is the updated version of HNSW 1000 and includes the same data structures as depicted in FIG. 10 (except with updated reference numerals) as well as additional data structures. Layer 2 (the top-most layer) has layer-to-layer map 1126 and local VID to global VID map 1128, while layer 1 has layer-to-layer map 1116. In response to a batch update or an incremental update, it may be automatically determined (e.g., by an index updating component) that a vertex for the new vector is to be inserted into layer 2. A naïve approach would be to assign that new vertex to the next available VID in vectors array 1130 (e.g., 50001) and to use that VID in the other layers of HNSW 1100. However, neighbor count array 1122 has a limited number of positions and it would be a waste of space to assign the new vertex to have a VID of 50000+, because then neighbor count array 1122 would have thousands of unused entries.

In the depicted embodiment, a new vertex/vector is assigned multiple local VIDs, each for a different layer of HNSW index 1100. Thus, the next available VID in neighbor count array 1122 is determined. In this example, that next available VID is 5. However, VID 5 is already assigned to another vector in vectors array 1130. Nevertheless, the new vector is also assigned the next available VID in vectors array 1130, which is, in this example, 54252. Therefore, the new vector has two VIDs: 5 and 54252. In response, local VID to global VID map 1128 is updated to associate the "local" VID of 5 (local to layer 2) to the "global" VID of 54252.

Because this new vertex is assigned to layer 2, a vertex of the new vector is also assigned to layer 1. Similarly, because neighbor count array 1112 has a limited number of positions and it would be a waste of space to assign the new vertex to have a VID of 54252 in layer 1, the next available VID in neighbor count array 1112 is determined. In this example, that next available VID in layer 1 is 78. Although not depicted in FIG. 11, layer 1 also has a local VID to global VID map, as in layer 2, so that vector distances may be computed during a search. Further, in this example, the new vertex in layer 1 has a neighbor (in layer 1) that is assigned VID 83 and, according to layer-to-layer map 1116, is mapped to VID 55600 in neighbor count array 1102. Thus, presuming that HNSW index 1000 had fifty thousand vectors when it was built, the vector assigned VID 55600 was added to the HNSW index sometime after HNSW index 1000 was built.

Transactionally-Consistent HNSW Index

While the HNSW index is one of the fastest vector indexes, there is lack of support for transactional semantics. Also, current implementations of the HNSW index do not provide multi-version concurrency control, such as for large enterprises (e.g., financial institutions) who want to use AI Vector Search for real-time actions, such as fraud detection and anomaly detection. Therefore, it is important to add transactional support to HNSW indexing strategies.

In an embodiment, an HNSW index supports transactional semantics. To support transactional semantics for HNSW indexes, four aspects are described: (1) efficient tracking of transaction changes; (2) efficient retrieval of transaction changes; (3) query results with consistent read (CR) semantics; and (4) accelerating Top K queries on a shared journal using local HNSW indexes.

Regarding (1) a DML transaction (i.e., the transaction that inserts one or more vectors, deletes one or more vectors, or updates/modifies one or more vectors) logs its changes in a transaction-specific in-memory private journal (e.g., one of private journals 916), which is only visible to the transaction and is, therefore, not visible to other transactions. For new or updated vectors, the new/updated vectors are stored in addition to row identifiers (referred to herein as "rowids") (identifying the rows in a base table where the new/updated vectors are stored) in separate in-memory extents.

When a DML transaction commits, its changes are flushed to an on-disk shared journal (e.g., shared journal table 924) as well as optionally stored in an in-memory shared journal (e.g., shared journal cache 918). In an embodiment, a shared journal comprises two tables with the transaction ID acting as the join key: (a) a CHANGE_LOG table that tracks the changes made by a transaction; and (b) a COMMIT_LOG table that tracks the commit SCN of every transaction.

For example, the CHANGE_LOG table may have at least three columns: one column for storing the transaction ID, another column for storing the type of modification (e.g., insert, delete, update), and another column for storing the inserted or modified vector. If the modification is a delete, then the third column may be blank or contain a null value. A single transaction may cause multiple modifications to multiple vectors. Therefore, the same transaction ID may be repeated multiple times in the CHANGE_LOG table. Another column in the CHANGE_LOG table may be a transaction change number (XCN) that orders changes within a transaction. Also, the transaction ID column may be implemented as three columns: one column for the undo segment number (which corresponding segment is where the transaction generates undo), another column for the slot number (which is the slot, in an undo segment transaction table, that this transaction occupies), and another column for a sequence number (which is a counter that is increased on every reuse because slots can be reused). Additional columns in the CHANGE_LOG table may be for a DML opcode and a Vector payload.

The COMMIT_LOG table may have two or more columns: one column for storing the transaction ID and another column for storing a commit time (e.g., SCN) of the corresponding transaction, where the transaction ID column may be implemented as three columns. In this way, only a single commit time needs to be stored per transaction, as opposed to storing a commit time for each change that resulted from the transaction. A row, in the COMMIT_LOG table, that represents a transaction, is atomically patched in a data block to reflect the commit SCN. This step is important to ensure transactional visibility of changes in the CHANGE_LOG table.

In an embodiment, the COMMIT_LOG table also has a partition ID column that is used to partition the COMMIT_LOG table. For example, a default rule may be that every partition of the COMMIT_LOG table is bounded to 1 GB in size. The initial partition may have a partition_id of 1. Once that partition reaches 1 GB in size, the "current partition_id" is changed to 2, and all transactions committing after that point will be associated with this value. In this way, transactions are grouped somewhat in timestamp (e.g., SCN) ranges.

Regarding (2) or the efficient retrieval of transaction changes, a common operation on the shared journal table may be to find the set of committed changes in a time window (e.g., an SCN window, such as between the SCN of the vector query/scan and the HNSW's build SCN). The shared journal is organized in a manner that makes this operation efficient. The shared journal may be list partitioned by a system-maintained incrementing partition_id column. This list partitioning ensures that there is no skew between partitions. New transactions are added to the latest partition. For example, a partition corresponding to partition_id=1 captures all transactions that committed between SCNs 101 and 200. A partition corresponding to Partition_id=2 captures all transactions between SCNs 201 to 300. When querying the shared journal, the query is by SCN range. However, partition pruning cannot be taken advantage of because the shared journal is partitioned by partition_id. For example, a query is looking for all changes between SCN 150 to 180. In order to prune the partition corresponding to partition_id=2, additional data structures are needed. This is where a partition-local B-tree index may come in. If a local B-tree index on COMMIT_SCN exists for each partition, then the minimum and the maximum values (the leftmost and rightmost leaf nodes) of the per-partition B-tree may be used to quickly prune out the partitions that are not interesting. Such an index is not built for a partition that is "open" (i.e. it is the current partition to which changes may be added) because it adds overhead to maintain the B-tree index. Instead, the system waits for the partition to be closed (i.e., the current partition_id advances) before creating an index for the closed partition.

FIG. 12 is a flow diagram that depicts an example process 1200 for recording changes to vectors and leveraging those changes du ring processing of a vector query, in an embodiment.

At block 1210, a change request is received. The change request may be in the form of a DML transaction. The change request may identify a set of one or more vectors (whether to insert or delete) and/or may specify one or more criteria that a vector (and/or an entity associated with the vector) must satisfy in order to modify the vector.

At block 1220, one or more changes to one or more vectors are stored in a private journal that is only visible to the transaction initiated by the change request.

At block 1230, once the transaction commits, the one or more vector changes are stored in a shared journal, each change indicating a type of vector change and a commit time of the vector change. The shared journal is visible (i.e., accessible) (and, therefore, its contents) to a vector query processing engine. A single transaction may result in many vector changes and, therefore, multiple vector changes logically have the same commit time in the shared journal (because a single commit time is stored per transaction in the commit_log table while the changes in the change_log table reference this commit time by the transaction ID foreign key).

At block 1240, a vector query is received. The vector query may have been composed by a user or a device that is remote relative to VDBMS 100. The vector query may be associated with a timestamp or SCN. If so, then the vector query may specify (or otherwise indicate) the timestamp or the timestamp may be inferred based on when VDBMS 100 receives the vector query. If the vector query specifies the timestamp, then the timestamp may indicate a time that is before the current timestamp (or the receipt timestamp of the vector query) and after the timestamp (or SCN) of the build of the HNSW index.

The vector query may be processed in a transaction that is separate from the transaction in which the change request was processed. For example, the change request and the vector query may have been received, by VDBMS 100, from different users or client devices, or by the same user/client device at different times. Alternatively, the vector query may have been processed in the same transaction as the change request. For example, the change request and the vector query may have been included in the same request, received by VDBMS 100, from a particular user or client device.

At block 1250, one or more changes in the shared journal are identified. Such identification may be based on a timestamp of the vector query, if such a timestamp exists. For example, if a change in the shared journal has a timestamp that is after the vector query timestamp, then the change is ignored. Conversely, if a change in the shared journal has a timestamp that is before the vector query timestamp, then the change is identified. A change of a vector may be a deletion of the vector, an insertion of the vector, or an update of the vector.

At block 1260, a final result is generated based on a result set from traversing (scanning) the HNSW index based on the vector query and the one or more changes in the shared journal. If a change is deletion, then it is determined whether the VID of the change is in the result set. If so, then the VID is removed from the result set. This is a post-filter approach. Alternatively, in a pre-filter approach where deleted VIDs are identified first, deleted VIDs are not returned from the HNSW graph search if, during exploration of the HNSW graph, a deleted VID is never moved from the candidates heap to the Top K heap. If the change is an insertion of a vector, then an operation is performed on the vector, such as a vector distance calculation or similarity score indicating a similarity between the inserted vector and the query vector. If the vector distance calculation is less than the largest vector distance calculation in the result set, then the VID of the inserted vector is added to the result set and the VID Of the largest vector distance calculation is removed from the result set. If a change is an update, then the processes described above for delete changes and insert changes are followed.

In a related embodiment, block 1250 occurs before the HNSW index is traversed or scanned based on the vector query. In this way, the one or more changes are known before (and can be applied during) traversal of the HNSW index. Otherwise, traversal of the HNSW index followed by applying the one or more changes may result in too few vectors. For example, if a vector query is a Top K query, K results are identified as a result of traversal of the HNSW index, and one or more deletes are identified in the shared journal where the VIDs of those deletes are in the K results, then fewer than K results will be returned. Otherwise, the HNSW index may have to be traversed again in order to increase the final results to K in number.

Transactionally-Consistent HNSW Index: Consistent Read

Regarding (3) or query results with consistent read semantics, the private journal and/or shared journal are used to guarantee consistent read (CR) semantics for Top K in-transaction and out-of-transaction vector queries. An in-transaction vector query is one that queries a set of data in the same transaction that caused the modification of the set of data. Thus, the vector query targets a set of data that was just changed by a DML transaction, but before the DML transaction commits, which would make the changes visible/ accessible to other transactions and queries.

FIG. 13 is a flow diagram that depicts an example process 1300 for processing an in-transaction read associated with a vector query, in an embodiment.

At block 1310, a first set of rowids that have recorded deletes in a private journal is identified. The private journal may be implemented as a table, a linked list, an array, etc. Each entry in the private journal associates a type of change with a rowid, identifying a row in a base table that stores vectors. Thus, block 1310 may involve identifying each entry in the private journal that indicates a deletion and, if so, retrieving the associated rowid. Some iterations of block 1310 may result in identifying no rowid if no deletes were recorded in the private journal.

At block 1320, a first set of vector IDs corresponding to the first set of rowids is identified from the ROWID-VID table, described previously. For example, for each rowid in the first set, an entry in the ROWID-VID table is identified that has a matching rowid. The VID in that entry is then retrieved. Block 1320 may be skipped if the first set of rowids is empty.

At block 1330, a second set of rowids that have recorded deletes in the shared journal between the query timestamp (e.g., SCN) and HNSW build timestamp (or SCN) is identified. Block 1330 is similar to block 1310 except for the shared journal and the timestamp check. Thus, some iterations of block 1330 may result in identifying no rowid if no deletes were recorded in the shared journal.

At block 1340, a second set of vector IDs corresponding to the second set of rowids is identified from the ROWID-VID table. Block 1340 is similar to block 1320 except for a different set of rowids. Block 1340 may be skipped if the second set of rowids is empty.

At block 1350, a delete filter combining both sets of vector IDs (representing deleted vectors) is generated. The delete filter may be implemented as an array, a bitmap, or a list. The contents of the delete filter may be ordered or unordered. If ordered, the delete filter may be ordered by VID in an increasing or decreasing manner. The delete filter may be a bitmap such that each entry in the bitmap is associated with an index value that is based on VID. Thus, a VID may be mapped to a specific entry in the VID and if the entry includes one value (such as a bit value of '1'), then that indicates that the corresponding vector is deleted; otherwise the corresponding vector is not deleted.

At block 1360, a traversal of an HNSW index for a Top K vector query is performed. When a VID is about to be added to a result set, it is first determined whether the VID is in the delete filter and, if so, then that VID skipped and, therefore, is not added to a temporary result set. This approach gives one set of Top K results.

In a related embodiment, a vector query processing engine maintains two heaps: a candidates heap and a Top K heap. Both heaps are initially empty when traversal of the HNSW index begins. The candidates heap is a staging area before VIDs are added to the Top K heap, which contains the Top K results thus far. The Top K heap may be an ordered list of VIDs, ordered based on vector distance to the query vector. When a VID and its neighbors are identified while traversing layer 0 of the HNSW index, that VID and the VIDs of its neighbors are stored in the candidates heap. Then, for each VID indicated in the candidates heap, it is determined whether the delete filter contains that VID. If so, that VID is ignored. (The HNSW index remains unchanged, despite the deleted vector.) If not, then it is determined whether the VID is better (e.g., closer in vector distance to the query vector) than any of the VIDs in the Top K heap. If so, that VID from the candidates heap replaces, in the Top K heap, the VID of the "worst" vector (e.g., farthest from the query vector in terms of vector distance). The addition of a VID from the candidates heap to the Top K heap may retain the ordering of the Top K heap by vector distance.

At block 1370, a Top K is computed for the private journal. Block 1370 may involve identifying all vectors that were inserted in the private journal, computing a vector distance of each identified vector to the query vector, and generating a Top K based on the computed vector distances. If K is equal to or larger than the number of inserts in the private journal, then all the corresponding vectors are returned as the Top K. Nevertheless, the vector distance is still computed for each identified vector.

Block 1370 may involve determining whether any vectors that are identified as inserted in the private journal were subsequently deleted. Thus, block 1370 may involve determining, for each inserted vector, whether that inserted vector is indicated in the private journal as deleted (and that deletion has a timestamp within the timestamp window of the vector query). Therefore, vectors that were inserted and then subsequently deleted (according to their respective timestamps or to their order in the private journal) are ignored when computing the Top K for the private journal.

At block 1380, a Top K is computed for the shared journal. Block 1380 is similar to block 1370, except with respect to the shared journal instead of the private journal and considering deletes from the private journal. Thus, block 1380 may involve identifying all vectors that were inserted in the shared journal, excluding vectors associated with rowids that are identified as deleted in the private journal, computing a vector distance of each identified vector to the query vector, and generating a Top K based on the computed vector distances.

Block 1380 may involve determining whether any vectors that are identified as inserted in the shared journal were subsequently deleted. Thus, block 1380 may involve determining, for each inserted vector, whether that inserted vector is indicated in the shared journal or the private journal as later deleted (and that deletion has a timestamp within the timestamp window of the vector query). Therefore, vectors that were inserted and then subsequently deleted (e.g., according to their respective timestamps or to their order in the shared journal) are ignored when computing the Top K for the shared journal.

Blocks 1360-1380 may be performed in parallel and, together, produce three sets of Top K results.

At block 1390, the Top K results of each of blocks 1360-1380 are combined to generate a final or "true" Top K results. The final Top K may comprise only vectors from block 1360, only vectors from block 1370, only vectors from block 1380, or any combination of vectors from blocks 1360-1380. In a related embodiment, block 1390 may involve first merging/combining the Top K results from block 1370 with the Top K results from block 1380. The merged results are then merged/combined with the Top K results from block 1360. Since the HNSW index is likely to be much larger than even the combined sizes of the private journal and the shared journal, the Top K results from blocks 1370 and 1380 might be available much sooner than the Top K results from block 1360. However, even though the HNSW graph contains more vectors than the private and shared journals, the search of the HNSW graph only scans $O(\log N)$ of vertices. Depending on the rate of DMLs and how frequently the HNSW graph is refreshed, the number of vectors in the shared journal may exceed $O(\log N)$ and, therefore, the Top K results from block 1360 might be available before the Top K results from block 1380.

In a related embodiment, one or more of blocks 1370 and 1380 are intentionally not performed. This may allow vector query processing to complete sooner and, optionally, achieve one or more time/resource constraints. For example, a vector query may be associated with one or more of a time constraint or a resource constraint. If performing either block 1370 or block 1380 or both would cause the vector query to exceed the time constraint (e.g., five seconds), then that block is not performed. Similarly, if performing either block 1370 or block 1380 or both would cause the vector query to exceed the resource constraint (e.g., greater than 100 MB of memory for vector query processing), then that block is not performed. As another example, a user or entity that initiates the vector query may be associated with an accuracy expectation, such as a threshold, rating, or category. (The association may be an explicit association that was specified in the vector query or may be a default association that was established previous to receiving the vector query.) If satisfying the vector query without using the private or shared journals satisfies the accuracy expectation of the vector query, then scanning the private and shared journals for inserts may be skipped. However, scanning the private and shared journals for deletes and constructing a delete filter may still be performed.

In a related embodiment to the embodiment of FIG. 13, a similar process is performed for an out-of-transaction read. One difference is that there are no blocks (or steps) for reading data from a private journal and, therefore, no Top K result generation based on a private journal.

Transactionally-Consistent HNSW Index: Partition-Specific HNSW Indexes

Regarding (4) or accelerating Top K queries, one approach for processing a Top K vector query is to search the entirety of the shared journal for modifications to vectors that are reflected in the HNSW index. In an embodiment, an HNSW index is built on each partition of the shared journal (or CHANGE_LOG table), except for the latest partition, which may still be continually modified by DML transactions. Thus, a partition-specific HNSW index may be built for a particular partition immediately after it is determined that no more transactions may be added to the particular partition.

In a related embodiment, a partition-specific HNSW index is only built for partitions that satisfy one or more criteria. Example criteria include a partition being greater than a certain size (e.g., in bytes or number of rows) and a partition having a minimum number of inserts.

Once partition-specific HNSW indexes are built on top of one or more shared journal partitions, processing Top K vector queries involves accessing those partition-specific HNSW indexes. If there are multiple partition-specific HNSW indexes, then they may be accessed in parallel during query processing, which further improves vector query response times. For partitions that do not have an HNSW index built for them, those partitions will need to be scanned directly (e.g., one entry or row at a time) without the benefit of a vector index.

In a related embodiment, a vector query includes a time range, such as a SCN range. A vector query execution engine may use this vector query time range to identify one or more partitions whose time ranges (or SCN ranges) do not overlap the query time range. Those one or more partitions (or any corresponding partition-specific HNSW indexes) are excluded from consideration (or not accessed) during vector query processing, as described previously.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
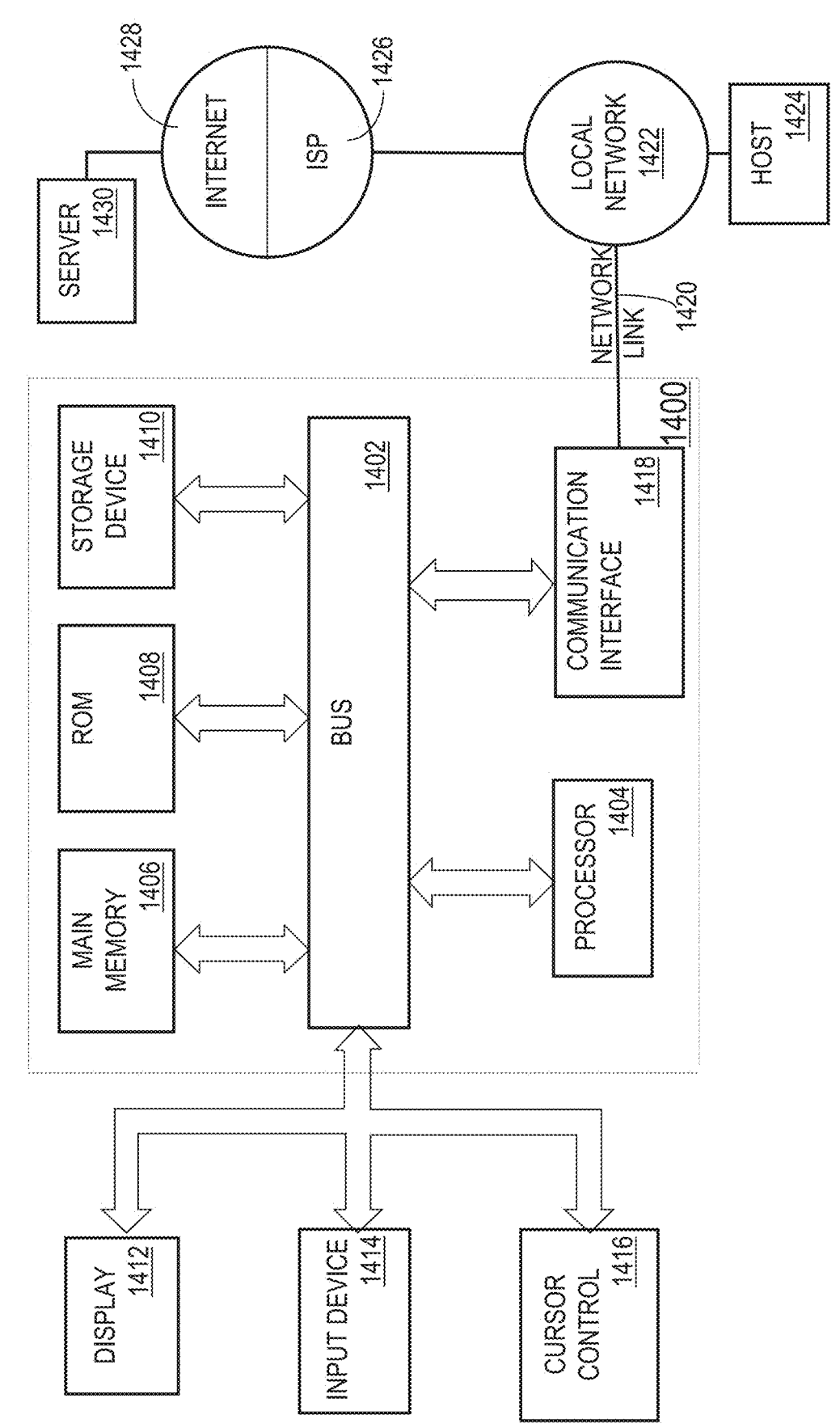
FIG. 14 is a block diagram that illustrates a computer system upon which an embodiment of the invention may be implemented.

For example, FIG. 14 is a block diagram that illustrates a computer system 1400 upon which an embodiment of the invention may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk, optical disk, or solid-state drive is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1410. Volatile media includes dynamic memory, such as main memory 1406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid-state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic, or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the worldwide packet data communication network now commonly referred to as the "Internet" 1428. Local network 1422 and Internet 1428 both use electrical, electromagnetic, or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

Software Overview

Figure 15:
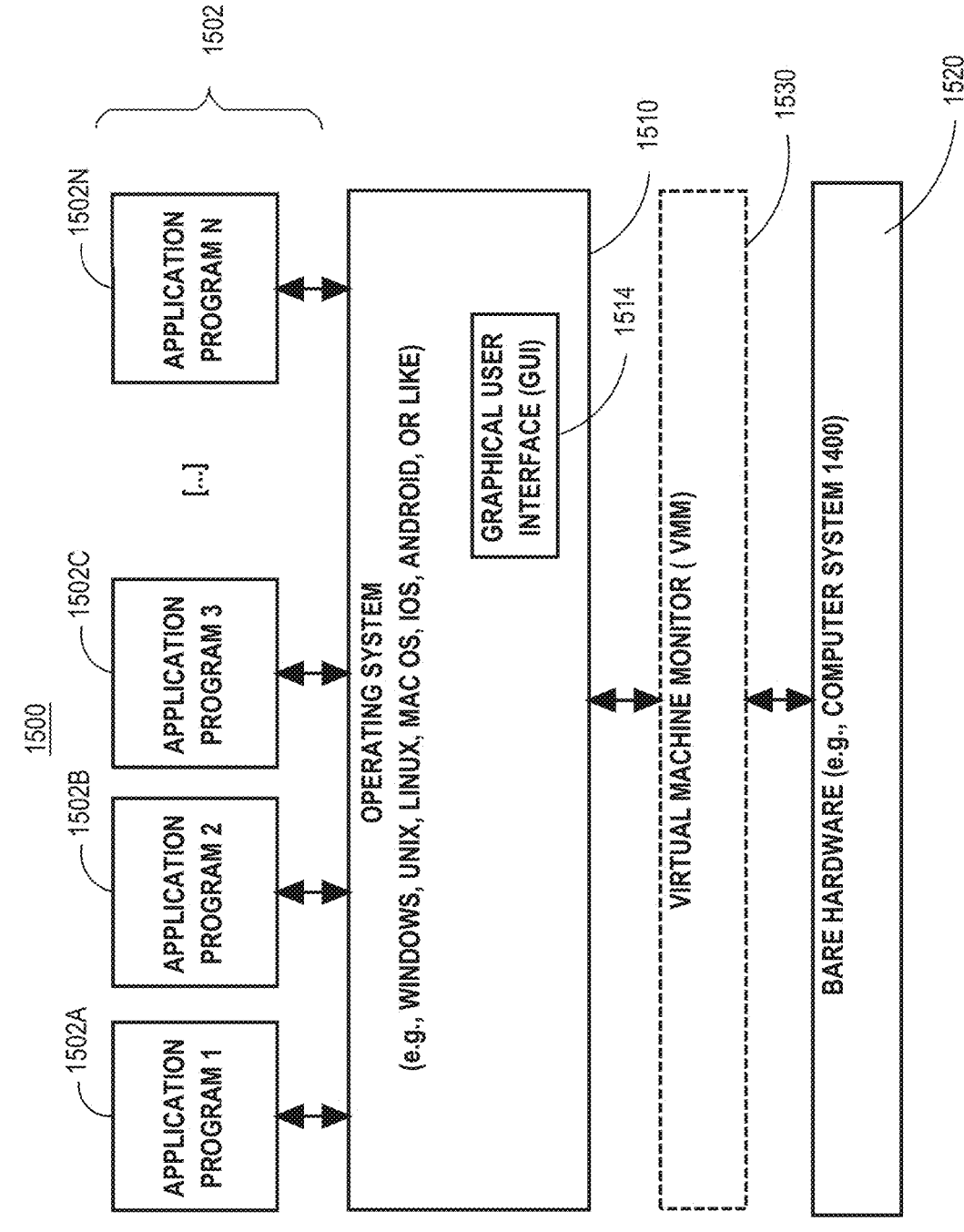
FIG. 15 is a block diagram of a basic software system that may be employed for controlling the operation of the computer system.

FIG. 15 is a block diagram of a basic software system 1500 that may be employed for controlling the operation of computer system 1400. Software system 1500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1500 is provided for directing the operation of computer system 1400. Software system 1500, which may be stored in system memory (RAM) 1406 and on fixed storage (e.g., hard disk or flash memory) 1410, includes a kernel or operating system (OS) 1510.

The OS 1510 manages low-level aspects of computer operation, including managing execution of processes, memory allocation, file input and output (I/O), and device I/O. One or more application programs, represented as 1502A, 1502B, 1502C . . . 1502N, may be "loaded" (e.g., transferred from fixed storage 1410 into memory 1406) for execution by the system 1500. The applications or other software intended for use on computer system 1400 may also be stored as a set of downloadable computer-executable instructions, for example, for downloading and installation from an Internet location (e.g., a Web server, an app store, or other online service).

Software system 1500 includes a graphical user interface (GUI) 1515, for receiving user commands and data in a graphical (e.g., "point-and-click" or "touch gesture") fashion. These inputs, in turn, may be acted upon by the system 1500 in accordance with instructions from operating system 1510 and/or application(s) 1502. The GUI 1515 also serves to display the results of operation from the OS 1510 and application(s) 1502, whereupon the user may supply additional inputs or terminate the session (e.g., log off).

OS 1510 can execute directly on the bare hardware 1520 (e.g., processor(s) 1404) of computer system 1400. Alternatively, a hypervisor or virtual machine monitor (VMM) 1530 may be interposed between the bare hardware 1520 and the OS 1510. In this configuration, VMM 1530 acts as a software "cushion" or virtualization layer between the OS 1510 and the bare hardware 1520 of the computer system 1400.

VMM 1530 instantiates and runs one or more virtual machine instances ("guest machines"). Each guest machine comprises a "guest" operating system, such as OS 1510, and one or more applications, such as application(s) 1502, designed to execute on the guest operating system. The VMM 1530 presents the guest operating systems with a virtual operating platform and manages the execution of the guest operating systems.

In some instances, the VMM 1530 may allow a guest operating system to run as if it is running on the bare hardware 1520 of computer system 1400 directly. In these instances, the same version of the guest operating system configured to execute on the bare hardware 1520 directly may also execute on VMM 1530 without modification or reconfiguration. In other words, VMM 1530 may provide full hardware and CPU virtualization to a guest operating system in some instances.

In other instances, a guest operating system may be specially designed or configured to execute on VMM 1530 for efficiency. In these instances, the guest operating system is "aware" that it executes on a virtual machine monitor. In other words, VMM 1530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

storing a Hierarchical Navigable Small Worlds (HNSW) index for a plurality of vectors;

in response to receiving a set of changes to the plurality of vectors, storing the set of changes in a shared journal table instead of applying the set of changes to the HNSW index, wherein the set of changes is a set of committed changes;

in response to receiving a vector query that includes a query vector:

based on the query vector, identifying a subset of the set of changes in the shared journal table;

based on the query vector and the HNSW index, identifying a subset of the plurality of vectors;

generating a result of the vector query based on the subset of the set of changes and the subset of the plurality of vectors;

wherein the method is performed by one or more computing devices.

2. The method of claim 1, wherein the set of changes includes a first change that is an insertion of a new vector and a second change that is a deletion of a particular vector in the plurality of vectors, wherein storing the set of change in the shared journal table comprises:

storing, in the shared journal table, a first entry that includes the new vector and one or more data items about the first change, including an indication of a first time that the first change committed;

storing, in the shared journal table, a second entry that indicates the particular vector, that indicates the second change is a deletion, and one or more data items about the second change, including an indication of a second time that the second change committed.

3. The method of claim 1, wherein:

the shared journal table comprises a change log table and a commit log table;

each entry in the change log table corresponds to a different change, stores an indication of a type of change corresponding to said each entry, and stores a transaction identifier that identifies a transaction that initiated the change that corresponds to said each entry;

each entry in the commit log table corresponds to a different transaction, stores a transaction identifier that identifies a transaction that initiated one or more changes that are indicated in the change log table, and stores a commit time of the transaction.

4. The method of claim 1, wherein:

a particular subset of the set of changes in the shared journal table correspond to deletions of one or more first vectors;

identifying a subset of the plurality of vectors comprises:

while accessing the HNSW index, determining whether an accessed vertex in the HNSW index corresponds to a vector in the one or more first vectors;

preventing a particular vector that corresponds to the accessed vertex to be included in the subset of the plurality of vectors if it is determined that the particular vector is one of the one or more first vectors.

5. The method of claim 1, wherein the vector query is part of a transaction that initiated one or more changes, the method further comprising:

storing the one or more changes in a private journal of the transaction;

based on the query vector, identifying a subset of the one or more changes in the private journal;

wherein generating the result of the vector query is also based at least on the subset of the one or more changes.

6. The method of claim 1, wherein:

the vector query is associated with a particular time;

identifying the subset of the set of changes in the shared journal table is also based at least on the particular time.

7. The method of claim 6, wherein identifying the subset of the set of changes in the share journal table comprises, for each change of multiple changes in the shared journal table:

determining whether said each change is associated with a time that is before the particular time;

including said each change in the subset of the set of changes if said each change is associated with a time that is before the particular time.

8. The method of claim 1, further comprising:

updating the HNSW index based on one or more insertions indicated in the shared journal table;

wherein updating the HNSW index comprises inserting, into the HNSW index, a particular vertex corresponding to a new vector corresponding to one of the one or more insertions;

wherein inserting comprises:

generating, for the new vector, (1) a first vector ID that is a layer-specific ID and (2) a second vector ID that is a global ID;

storing, in a mapping associated with a top layer of the HNSW index, an association between the first vector ID and the second vector ID.

9. The method of claim 1, wherein:

the vector query is a Top K vector query;

the number of vectors in the subset of the plurality of vectors is K;

the number of vectors in the subset of the set of changes is less than or equal to K;

generating the result of the vector query comprises determining a Top K of (1) the vectors in the subset of the plurality of vectors and (2) the vectors in the subset of the set of changes.

10. The method of claim 1, further comprising:

partitioning the shared journal table based on commit time of change in the shared journal table to generate a plurality of partitions, each partition comprising a different set of changes from the shared journal table;

for each partition of one or more partitions of the plurality of partitions, generating a partition-specific HNSW index for said each partition based on the changes that are in said each partition;

wherein identifying the subset of the set of changes in the shared journal table comprises accessing one or more partition-specific HNSW indexes based on the query vector.

11. The method of claim 1, further comprising, prior to storing the HNSW index:

generating the HNSW index, wherein generating the HNSW index comprises identifying a first subset of the plurality of vectors that will be assigned to the highest layer in the HNSW index;

based on being assigned to the highest layer in the HNSW index, assigning the vectors, in the first subset, vector identifiers that are lower than vector identifiers that will be assigned to vectors, in the plurality of vectors, that are not assigned to the highest layer in the HNSW index.

12. One or more non-transitory storage media storing instructions which, when executed by one or more computing devices, cause:

storing a Hierarchical Navigable Small Worlds (HNSW) index for a plurality of vectors;

in response to receiving a set of changes to the plurality of vectors, storing the set of changes in a shared journal table instead of applying the set of changes to the HNSW index, wherein the set of changes is a set of committed changes;

in response to receiving a vector query that includes a query vector:

based on the query vector, identifying a subset of the set of changes in the shared journal table;

based on the query vector and the HNSW index, identifying a subset of the plurality of vectors;

generating a result of the vector query based on the subset of the set of changes and the subset of the plurality of vectors.

13. The one or more storage media of claim 12, wherein the set of changes includes a first change that is an insertion of a new vector and a second change that is a deletion of a particular vector in the plurality of vectors, wherein storing the set of change in the shared journal table comprises:

storing, in the shared journal table, a first entry that includes the new vector and one or more data items about the first change, including an indication of a first time that the first change committed;

storing, in the shared journal table, a second entry that indicates the particular vector, that indicates the second change is a deletion, and one or more data items about the second change, including an indication of a second time that the second change committed.

14. The one or more storage media of claim 12, wherein:

the shared journal table comprises a change log table and a commit log table;

each entry in the change log table corresponds to a different change, stores an indication of a type of change corresponding to said each entry, and stores a transaction identifier that identifies a transaction that initiated the change that corresponds to said each entry;

each entry in the commit log table corresponds to a different transaction, stores a transaction identifier that identifies a transaction that initiated one or more changes that are indicated in the change log table, and stores a commit time of the transaction.

15. The one or more storage media of claim 12, wherein:

a particular subset of the set of changes in the shared journal table correspond to deletions of one or more first vectors;

identifying a subset of the plurality of vectors comprises:

while accessing the HNSW index, determining whether an accessed vertex in the HNSW index corresponds to a vector in the one or more first vectors;

preventing a particular vector that corresponds to the accessed vertex to be included in the subset of the plurality of vectors if it is determined that the particular vector is one of the one or more first vectors.

16. The one or more storage media of claim 12, wherein the vector query is part of a transaction that initiated one or more changes, wherein the instructions, when executed by the one or more computing devices, further cause:

storing the one or more changes in a private journal of the transaction;

based on the query vector, identifying a subset of the one or more changes in the private journal;

wherein generating the result of the vector query is also based at least on the subset of the one or more changes.

17. The one or more storage media of claim 12, wherein:

the vector query is associated with a particular time;

identifying the subset of the set of changes in the shared journal table is also based at least on the particular time.

18. The one or more storage media of claim 17, wherein identifying the subset of the set of changes in the share journal table comprises, for each change of multiple changes in the shared journal table:

determining whether said each change is associated with a time that is before the particular time;

including said each change in the subset of the set of changes if said each change is associated with a time that is before the particular time.

19. The one or more storage media of claim 12, wherein the instructions, when executed by the one or more computing devices, further cause:

updating the HNSW index based on one or more insertions indicated in the shared journal table;

wherein updating the HNSW index comprises inserting, into the HNSW index, a particular vertex corresponding to a new vector corresponding to one of the one or more insertions;

wherein inserting comprises:

generating, for the new vector, (1) a first vector ID that is a layer-specific ID and (2) a second vector ID that is a global ID;

storing, in a mapping associated with a top layer of the HNSW index, an association between the first vector ID and the second vector ID.

20. The one or more storage media of claim 12, wherein:

the vector query is a Top K vector query;

the number of vectors in the subset of the plurality of vectors is K;

the number of vectors in the subset of the set of changes is less than or equal to K;

generating the result of the vector query comprises determining a Top K of (1) the vectors in the subset of the plurality of vectors and (2) the vectors in the subset of the set of changes.

* * * * *